(12) United States Patent
Sharon et al.

(10) Patent No.: US 7,746,559 B2
(45) Date of Patent: Jun. 29, 2010

(54) IMAGE PROJECTING DEVICE AND METHOD

(75) Inventors: Ilan Sharon, Reut (IL); Zeev Zalevsky, Rosh HaAyin (IL); Golan Manor, Tel Aviv (IL); Yuval Kapellner, Bat Yam (IL)

(73) Assignee: Explay Ltd., Herzliya (IL)

(*) Notice: Subject to any disclaimer, the term of this patent is extended or adjusted under 35 U.S.C. 154(b) by 364 days.

(21) Appl. No.: 11/176,670

(22) Filed: Jul. 8, 2005

(65) Prior Publication Data

US 2006/0018025 A1 Jan. 26, 2006

Related U.S. Application Data

(63) Continuation-in-part of application No. PCT/IL03/00025, filed on Jan. 8, 2003.

(51) Int. Cl.
*G02B 27/10* (2006.01)

(52) U.S. Cl. ...................... 359/618; 359/619

(58) Field of Classification Search ......... 359/618–624; 349/95, 96
See application file for complete search history.

(56) References Cited

U.S. PATENT DOCUMENTS

| | | | | |
|---|---|---|---|---|
| 5,313,479 A | * | 5/1994 | Florence | ............ 372/26 |
| 5,398,125 A | * | 3/1995 | Willett et al. | ......... 349/95 |
| 5,508,834 A | * | 4/1996 | Yamada et al. | ......... 349/58 |
| 5,517,263 A | | 5/1996 | Minich et al. | |
| 5,563,710 A | | 10/1996 | Webb et al. | |
| 5,704,700 A | | 1/1998 | Kappel et al. | |
| 5,777,789 A | | 7/1998 | Chiu et al. | |
| 5,971,545 A | | 10/1999 | Haitz | |
| 5,975,703 A | | 11/1999 | Holman et al. | |
| 6,183,092 B1 | | 2/2001 | Troyer | |
| 6,445,487 B1 | * | 9/2002 | Roddy et al. | ......... 359/278 |
| 6,680,762 B2 | * | 1/2004 | Fukuda et al. | ......... 349/95 |
| 2002/0126390 A1 | * | 9/2002 | Matsushita et al. | ......... 359/621 |

FOREIGN PATENT DOCUMENTS

| | | |
|---|---|---|
| EP | 0609055 A1 | 8/1994 |
| JP | 02262185 | 10/1990 |
| JP | 05053101 | 3/1993 |
| JP | 2000131664 | 10/2000 |
| JP | 2001059963 | 3/2001 |

* cited by examiner

*Primary Examiner*—Alicia M Harringto
(74) *Attorney, Agent, or Firm*—Browdy and Neimark, PLLC

(57) ABSTRACT

An image projecting device and method are presented. The device comprises a light source system, a spatial light modulator (SLM) unit, and an image projection optics accommodated at the output side of the SLM unit. The SLM unit may be reflective or transmissive. The SLM unit comprises an SLM pixel arrangement enclosed between two glass substrates. The pixel array arrangement is formed by a pixel array assembly and at least one microlens assembly. The microlens assembly includes at least one microlens array accommodated proximate of the pixel array assembly. The light source system may comprise n light sources and a light converting means in optical path of light generated by the n light sources, to thereby produce m light beams of different wavelength ranges, wherein m>n. The light source system may comprise a multi-mode laser, thereby reducing a speckle effect in an integrated speckle pattern produced by the multiple modes, as compared to that of a single mode.

57 Claims, 12 Drawing Sheets

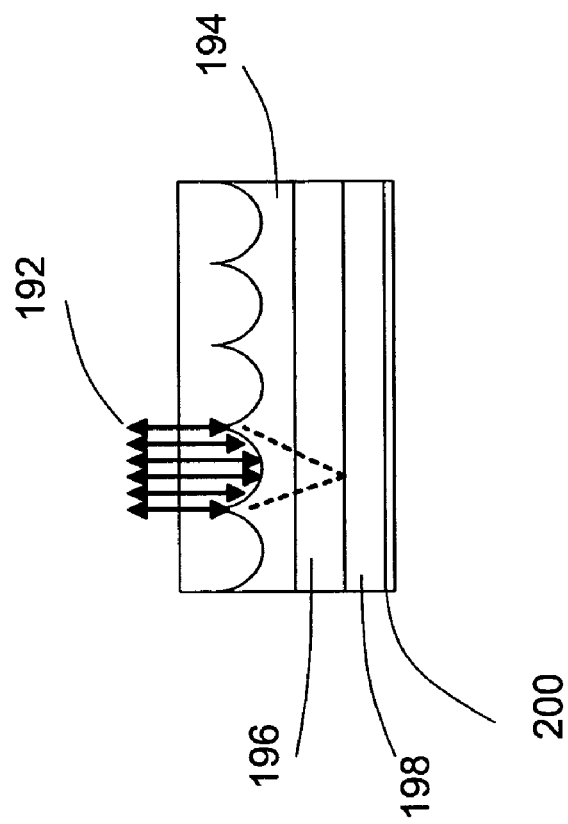
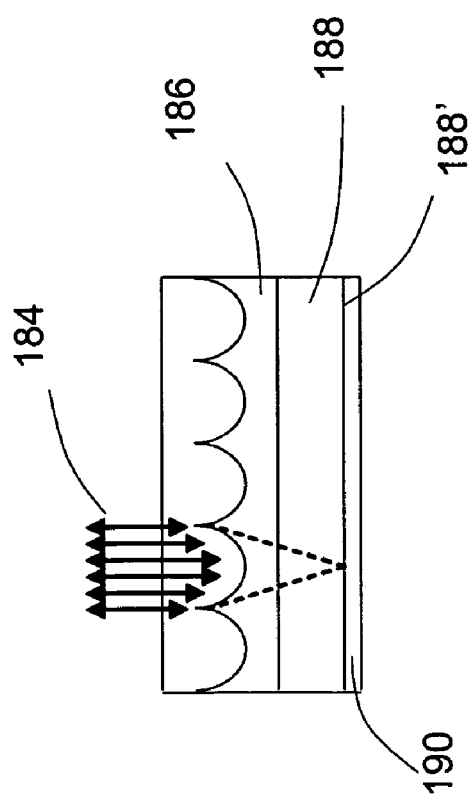

IMAGE PROJECTING DEVICE AND METHOD

CROSS REFERENCE TO RELATED APPLICATIONS

The present application is a continuation-in-part of International Application No. PCT/IL2003/000025, filed Jan. 8, 2003. The entire contents of this application being hereby incorporated herein by reference.

FIELD OF THE INVENTION

This invention relates to a compact-size image projecting device and method.

BACKGROUND OF THE INVENTION

Microdisplays are miniaturized displays, typically with a screen size of less than 1.5" in diagonal. Microdisplays are commonly used in data projectors, head mounted displays, and in the traditional viewfinders of digital cameras. They can be implemented within compact projectors, in viewfinders of handheld Internet appliances and in mobile phones for Web surfing and videoconferences, as full computer screens can be viewed in these devices.

Most microdisplays use a light-valve made of a silicon chip as the substrate material. The chip also houses the addressing electronics (at least an active matrix with integrated drivers), usually implemented in standard CMOS technology which allows very reliable and stable circuits, as well as very small pixel pitches (down to 10 μm or even somewhat smaller), as well as high display resolutions.

In the art, there are known reflective and transmissive light valves. The reflective light valves bounce light off the displayed image into the viewer's lens or the projection lens. The transmissive light valves are similar to backlit, portable computer screens using LCD (Liquid Crystal Display) and EL (electro-lumination) technologies. Common reflective light valves are based on Liquid Crystal On Silicon (LCOS) and tilted micro-mirrors (DMD). Common transmissive light valves are based on Active-Matrix Liquid Crystal Displays (AMLCD).

Projectors that use transmissive microdisplays as mentioned above typically comprise an optical path that includes a light source and a Spatial Light Modulator (SLM), in which a beam shaping optic component, as well as a polarizing component are disposed between them. Another polarizing component and a magnifying optic component are generally disposed between the SLM and the projection surface. The SLM is coupled to a video processing driver to produce the image modulation of the light according to an input signal.

Common optical difficulties in the design of known projectors based on a microdisplay are as follows: low energy efficiency; low brightness and non-uniformity of the output image due to the source non-uniform intensity distribution (i.e. Gaussian distribution over the SLM surface) and intensity losses; low focus depth of the output image. In laser based projectors, the "speckle" phenomena of a Laser source according to which a granular pattern of light pervades the image, is also considered as a technical difficulty. Other common difficulties directly related to the optical difficulties and to the hardware implementation are: size, weight, optical complexity, power consumption and the mobility of the overall projecting device.

Different methods and devices addressed to overcome one or more of the above-mentioned difficulties are disclosed by the following.

U.S. Pat. No. 5,971,545 discloses a compact and energy efficient projection display utilizing a reflective light valve. The output beams of the light sources are received by at least one spatial light modulator. The modulated output beams are collimated and combined. A projection lens receives the collimated and combined output beams and directs them towards a projection screen. Energy efficiency is achieved by using sequentially strobed RGB light sources instead of a white light source.

U.S. Pat. No. 5,777,789 discloses an optical system for high-resolution projection display, consisting of reflection birefringent (double refractive) light valves. The LCD projector comprises a polarizing beam splitter, color image combining prisms, illumination system, projection lens, filters for color and contrast control, and a screen. The illumination system includes a light source such as a metal-halide arc lamp, an ultraviolet and infrared filter or filters positioned in the optical path from the light source for filtering out the infrared and ultraviolet light emitted from the light source, a light tunnel for providing uniform light intensity, and a relay lens system for magnifying the illumination system output plane and imaging said plane onto the liquid crystal light valves.

U.S. Pat. No. 5,975,703 discloses an image projection device having an SLM and a polarized source system. The optical system uses polarized light manipulated by at least one of a conicoid, or plane optical elements to affect a folded mirror system to project an image onto a screen by utilizing input light components of more than one state of polarization, thus reducing intensity losses over the optical system due to polarization filtering. The system supplies light components of substantially orthogonal polarizations for separate areas of the SLM to be output onto a projection screen.

U.S. Pat. No. 5,563,710 discloses a confocal laser imaging system including a laser source, a beam splitter, focusing elements, and a photosensitive detector. The laser source projects a laser beam along a first optical path at an object to be imaged, and modulates the intensity of the projected laser beam in response to light reflected from the object. A beam splitter directs a portion of the projected laser beam onto a photodetector, which monitors the intensity of the laser output. The laser source can be an electrically scannable array, with a lens or objective assembly for focusing light generated by the array onto the object of interest. As the array is energized, its laser beams scan over the object, and light reflected at each point is returned by the lens to the element of the array from which it originated. A single photosensitive detector element can generate an intensity-representative signal for all lasers of the array. The intensity-representative signal from the photosensitive detector can be processed to provide an image of the object of interest.

U.S. Pat. No. 6,183,092 discloses a laser projector which includes a laser apparatus and a reflective liquid-crystal light valve capable of speckle suppression through beam-path displacement: by deflecting the beam during projection, thereby avoiding both absorption and diffusion of the beam while preserving pseudocollimation (noncrossing rays). The latter, in turn, is important to infinite sharpness. Path displacement is achieved by scanning the beam on the light valves which also provides several improvements in energy efficiency, brightness, contrast, beam uniformity (by suppressing both laser-mode ripple and artifacts), and convenient beam-turning to transfer the beam between apparatus tiers. The deflection effect is performed by a mirror mounted on a galvanometer or motor for rotary oscillation; images are written incrementally on successive portions of the light valve control stage (either optical or electronic) while the laser "reading beam" is synchronized on the output stage. The beam is shaped, with very little energy loss to masking, into a shallow cross-section which is shifted on the viewing screen as well as the light valves. Beam-splitter/analyzer cubes are preferred over polarizing sheets. Spatial modulation provided by a light valve and maintained by pseudocollimation enables imaging on irregular projection media.

U.S. Pat. No. 5,517,263 discloses a compact size projection system which includes a bright light source of polarized light, and a spatial light modulator, having an alignment layer, to modulate the polarized projection light, wherein the bright polarized light source is aligned with the alignment layer to permit the polarized light to pass therethrough without the need for unwanted light blocking polarizers. The use of a polarized laser source together with its proper alignment with the light valve, enables substantially all of the laser light beams to be utilized by the SLM to form the projected image.

U.S. Pat. No. 5,704,700 discloses a laser illuminated and SLM-based projection system that includes a microlaser array coupled with a beam shaper to produce a bright (i.e. having a uniform intensity distribution) projection light beam to be impinged over the SLM. The beam shaper includes a binary phase plate, a microlens array arrangement or a diffuser arrangement to modify the shape and intensity profile of the projection light beam. The laser light illuminating the light valve thus has a uniform intensity distribution for projecting an extremely bright image, and is confined substantially to the pixel portion of the light valve.

SUMMARY OF THE INVENTION

There is a need in the art to facilitate the projection of images by providing a novel miniature projector device and method. The device of the present invention is lightweight and highly efficient, and is capable of utilizing a high-ratio polarized light source, high-efficiency SLM performing digital processing of data to be imaged so as to significantly reduce the speckles' associated effects, as well as performing digital processing of a projected image to improve its uniformity.

The present invention provides for incorporating one or more microlens arrays (constituting a microlens assembly) within the pixel array arrangement of an SLM unit. This is implemented by making the microlens assembly in a polymer layer structure enclosed between the pixel array assembly (i.e., an array of LC cells defined by LC materials and an array of electrodes) and a substrate (typically glass). In other words, the microlens/lenslet assembly is fabricated in polymer spacers in a multi-layer structure between the pixel array assembly and the substrate of the SLM unit. Thus, the pixel array assembly and one or more microlens assembly form together a pixel array arrangement of the SLM unit enclosed between two substrates. The SLM unit may be configured to operate in a transmitting mode, in which case two microlens assemblies (each including one or more microlens/lenslet arrays) are located at opposite sides of the pixel array assembly; or may be configured to operate in a reflective mode, in which case the microlens assembly is located at one side of the pixel array assembly.

According to one broad aspect of the present invention, there is provided an image projecting device comprising a light source system, a spatial light modulator (SLM) unit, and an image projection optics accommodated at the output side of the SLM unit, the device being characterized in at least one of the following:

(i) said SLM unit includes a pixel array arrangement in the form of a multi-layer structure defining a pixel array assembly and at least one microlens assembly enclosed between two substrates, the microlens assembly including at least one microlens array accommodated proximate of the pixel array assembly at least upstream thereof with respect to a direction of propagation of light from the light source system towards the SLM unit, and operating to condense and focus incident light onto the pixel array;

(ii) said SLM unit including a pixel array assembly and a microlens assembly, the microlens assembly having first and second microlens arrays accommodated in a spaced-apart parallel relationship at least upstream of the pixel array assembly with respect to a direction of propagation of light from the light source system towards the SLM unit, the lenses of said second array located closer to the pixel array assembly being smaller or having a different focal length than those of the first array, the lenslet assembly thereby condensing and focusing the incident light to impinge in form of a plurality of parallel light components onto a plurality of pixels, respectively;

(iii) the light source system comprises n light sources and a light converting means in optical path of light generated by the n light sources to thereby produce m light beams of different wavelength ranges, wherein m>n;

(iv) the light source system comprises a multi-mode laser, thereby reducing a speckle effect in an integrated speckle pattern produced by the multiple modes, as compared to that of a single mode;

(v) the light source system comprises at least one highly polarized light source and a randomly polarized light source.

The microlens array is preferably manufactured as a surface relief at the interface between two polymer layers (constituting a polymer layer structure) with optional additional polymer(s) as spacer(s) between one microlens arrays and the other or between one microlens array and the pixel array assembly, in order to control the distances of propagation to correspond to the focal length and the focus position of the microlens arrays. The refractive indices of the polymers can be appropriately selected to make a condensing or diverging lens. If creation of a condensing lens is required, then there is an option to have a convex lens pattern in a higher refractive index material and coat it with a lower refractive index material. If a diverging lens is required, then a convex lens pattern in a lower refractive index polymer can be coated by a higher refractive index material. Similar options are possible for concave lens patterns, by replacing the high refractive index material by low refractive index material.

The device of the present invention may utilize the SLM type (its LC medium) that does not require polarization of the light, or alternatively may utilize an SLM of the kind operating with specifically polarized light. In the latter case, the device is designed so as to provide specific polarization of the SLM input and output light. This can be implemented by using a polarizer unit at the output of the pixel array arrangement and either using an input polarizer or a light source of the kind generating high-ratio polarized light. The input polarizer may be part of the light source system or the SLM unit or may be a stand alone device between the light source and the SLM. Preferably, in the case of the reflective SLM, the device comprises a polarization beam splitter between the light source system and the SLM unit.

The light source system may comprise an optical arrangement operable to provide substantially uniform intensity distribution within the cross-section of the incident light beam. This optical arrangement includes a diffractive element (commonly referred to as "top-hat beam shaper") operable to modify the beam intensity distribution to produce the substantially uniform intensity distribution of the beam within its cross-section Preferably, if the use of polarized light is required, the light source used in the device of the present invention is of the kind generating a high-ratio polarized light beam, and preferably also of the kind generating the light beam of the cross section substantially of the size of the active surface of the SLM pixel arrangement (thus enabling the elimination of the beam shaping optics) or alternatively equipped with a beam shaping optics to provide the desired beam cross section.

The microlens assembly may comprise first and second similar microlens arrays at opposite sides of the pixel array assembly, respectively, such that each lens in the first array is associated with a corresponding pixel of the pixel array and with the corresponding lens in the second array, each lens being substantially of the pixel size.

The microlens assembly may comprise a pair of first and second microlens arrays accommodated in a spaced-apart parallel relationship at the same side of the pixel array assembly, and a pair of first and second microlens arrays at the opposite side of the pixel array assembly, the second lens arrays situated closer to the pixel array assembly having lenses smaller than those of the first lens arrays or of the same size but different focal length. Preferably, the lenses of the second array (that is closer to the pixel array) are substantially of the pixel size.

Preferably, the device of the present invention comprises an image processor system (control unit) operable to carry out at least one of the following: applying digital processing to data indicative of an image to be projected so as to avoid or at least significantly reduce the speckle-associated effects in the projected image; processing data indicative of the projected image to correct for non-uniformities in the light intensity; and analyzing data indicative of the environmental condition to adjust the intensity and/or the color mixture of the incident light beam.

The device of the present invention may be operable to provide color images. This can be implemented by utilizing three separate SLM units, each for a corresponding one of three primary colors, or by utilizing the same SLM unit for all the primary colors, but providing time modulation of the color light components. The analysis of the data indicative of the environmental condition may alternatively or additionally be aimed at adjusting the color mixture of the incident light beam.

The light source system may be operable to produce several light beams of several different wavelength ranges. In this case, all these light beams may pass through a wavelength-selective periscope structure allowing transparency for given wavelengths and reflecting other wavelengths, and then pass through the common SLM unit. Alternatively, each of these incident beams passes through its own SLM unit, and the modulated light beams pass through a wavelength combiner.

The several light beams of different wavelength ranges may be produced by a lower number of light sources (at least some of them preferably being highly polarized light sources). For example, the light source system may comprise a laser diode, and a splitter assembly (e.g. beam splitter/electrooptical switch and mirror), and operates for emitting a light beam of the non-visible range, splitting said emitted light beam into at least two light components for pumping at least two laser crystals, respectively, and applying second or third harmonic generation to the outputs of these two laser crystals, or alternatively, operates for splitting a laser light beam from a single light source having at least two light components of different wavelengths in the non-visible range, and applying separate second harmonic generation to these light components, to thereby produce light beams of the visible range.

The device of the present invention can be used with any conventional video generating device to project images onto an external screen surface. The device can be operable in a specific system to project the same image with two different angles of projection, thereby enabling observation of the same image by two different observers, and also allows for private operation of the respective one of the images by each of the observers through his viewing area.

The technique of the present invention allows for combining images projected by several micro-projectors of the present invention, thereby allowing the creation of a large combined image; projecting the image onto a concaved screen surface; and the creation of stereoscopic images by using two micro-projectors or the single micro-projector equipped with a rotating mirror.

The present invention, according to yet another aspect provides a method for projecting an image comprising:

(i) creating at least one incident light beam having a predetermined cross section corresponding to a size of an active surface of a spatial light modulator (SLM) unit defined by its pixel array assembly, and directing the incident light towards the pixel array assembly;

(ii) operating the pixel assembly with an imaging signal representative of an image to be projected, thereby causing modulation of the light passing through the pixel assembly;

(iii) passing the modulated light through an image projecting optics to a projecting surface;

the method being characterized in at least one of the following:

(a) said incident light beam, while propagating towards the pixel array assembly inside the SLM unit, and the modulated light, while propagating from the pixel array assembly inside the SLM unit, pass through at least one microlens array that condenses and focuses a plurality of light components of the incident light to the centers of a plurality of said pixels, respectively, and converts the condensed beams of the modulated light from the pixel array assembly into substantially parallel beams;

(b) said incident light beam, propagating towards the pixel array assembly, passes through first and second microlens arrays accommodated in a spaced-apart parallel relationship, wherein the lenses of said second array located closer to the pixel array assembly are smaller than those of the first array, the incident light being thereby condensed and focused to impinge onto a plurality of pixels in form of a plurality of parallel light components, respectively;

(c) m light beams of different wavelength ranges are created by a light source system including n light sources and a light converting means in optical path of light generated by the n light sources, wherein m>n;

(d) a speckle effect in a projected image is reduced by using a multi-mode laser for the creation of said at least one incident light beam.

(e) a colored image is projected by creating the incident light beams of different wavelength ranges by at least one-highly polarized light source and a randomly-polarized light source.

BRIEF DESCRIPTION OF THE DRAWINGS

In order to understand the invention and to see how it may be carried out in practice, preferred embodiments will now be described, by way of non-limiting example only, with reference to the accompanying drawings, in which:

FIGS. 3A and 3B illustrate two specific examples of the SLM pixel arrangement of the present invention utilizing a lenslet assembly including a single lenslet array;

DETAILED DESCRIPTION OF THE INVENTION

Figure 1:
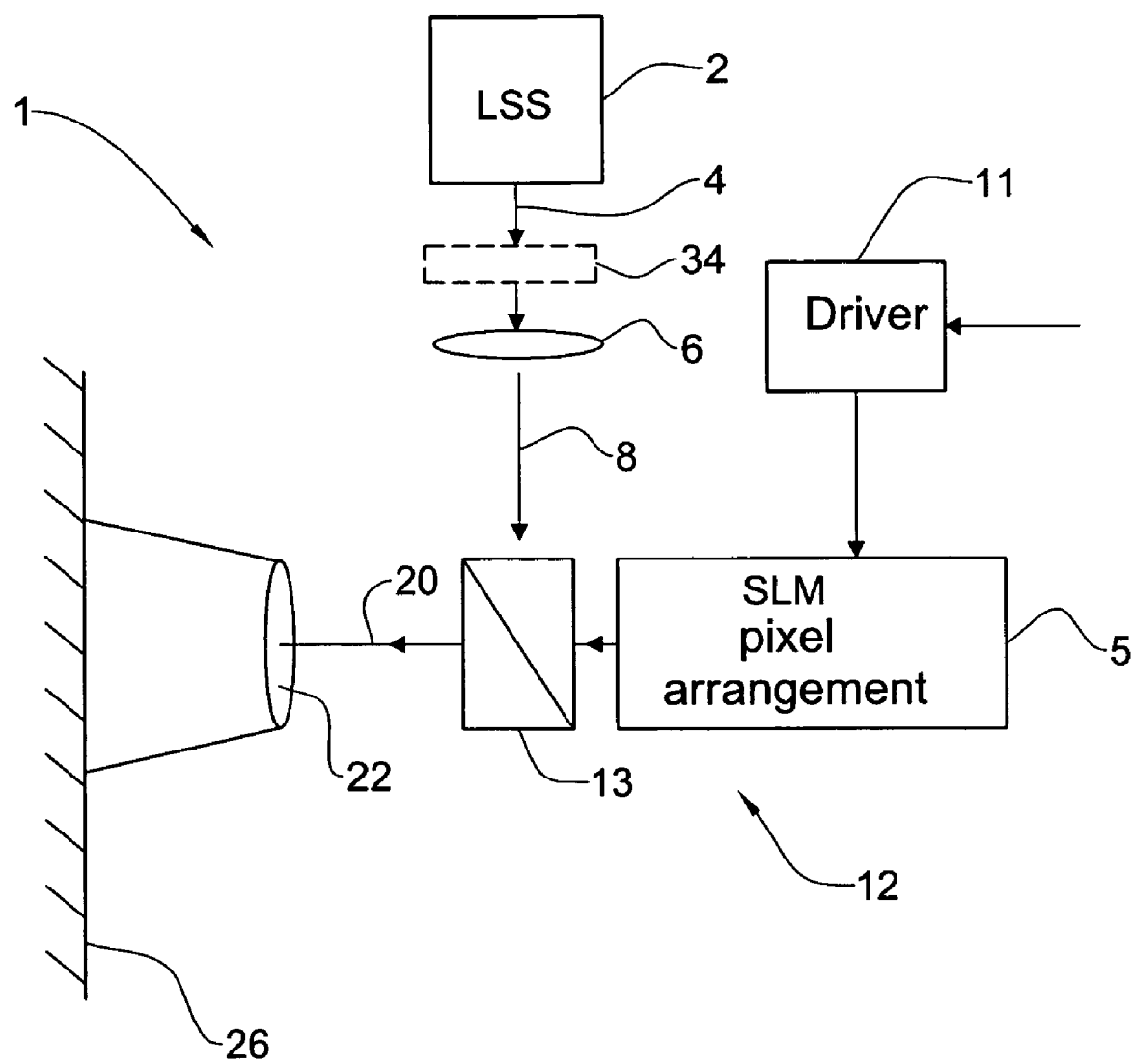
FIG. 1 is a schematic block diagram of a projecting device according to the invention showing the main optical components of a light propagation scheme.

Referring to FIG. 1 there is schematically illustrated a block diagram of a projecting device 1 according to the invention showing the optical components of a light propagation scheme. The device 1 comprises a light source system LSS including a light source 2 generating a collimated light beam 4; an SLM unit 12; an image projection optics 22 (e.g., a magnifying lens arrangement) located in the optical path of light emerging from the SLM unit and propagating towards a projecting (or screen) surface 26.

The SLM unit 12 (which in the present example is of reflective type) includes a pixel arrangement 5 formed by a pixel assembly (the so-called "windowed structure") and a lenslet assembly (as will be described more specifically further below) enclosed between two substrates (e.g., glass substrates), and includes a beam splitter/combiner 13 (preferably polarization beam splitter). Preferably, the device 1 includes a diffractive element 34 ("top-hat beam shaping optical element") shown in dashed lines that is operable to affect the intensity distribution of the beam 4 to produce substantially uniform intensity distribution thereof within its cross section. Also optionally provided in the device 1 is a beam shaping optics (beam expander) 6 that affects the cross section of the beam 4 to be substantially equal to the size of an active surface defined by the pixel arrangement. It should be noted that the effect of beam expanding can be achieved by providing an appropriate light source, for example, a laser diode/DPSS laser module with a beam diameter of 6 mm to cover the image modulation area on the pixel arrangement of the SLM.

It should be noted that the SLM unit may be of the kind operating with randomly polarized light, or of the kind operating with specifically polarized light. If the SLM unit is of the kind operating with specifically polarized light, the light beam impinging onto the SLM pixel arrangement has a specific linear polarization, and the device comprises an output polarizer (analyzer). Generally, the provision of an input polarizer (upstream of the SLM pixel arrangement) and the provision of an output polarizer (downstream of the SLM pixel arrangement) depend on the kind of SLM pixel arrangement and the kind of light source used in the device 1. The output polarizer, if needed, has a preferred orientation of the plane of polarization either similar to that of the incident light beam 4 or 90°-rotated, and therefore blocks either the part of light that has been rotated by the SLM, or the part that has not been affected by the SLM. As for the polarization of the incident light beam, it is preferably achieved by using the light source of the kind generating high-ratio polarized light, but can, generally, be achieved by using a light source generating randomly polarized light and using a separate polarizer at the input side of the active surface of the pixel assembly. This input polarizer can be a part of the light source system, a part of the SLM unit, or can be a stand-alone unit accommodated between the light source and the SLM unit. In the example of FIG. 1, such input/output polarization means can be constituted by the polarization beam splitter 13.

Thus, in the example of FIG. 1, the SLM is of the reflective kind operating with polarized light, the light source generates high polarization ratio light, and the polarization beam splitter 13 is used. The term "high polarization ratio" is typically referred to as that of about 1:50, 1:100 polarized light or above, and can for example be achieved with a laser diode and DPSS laser modules, such as the GMC-532-XF5 laser module series, commercially available from Lasermate Corporation USA.

Thus, the collimated polarized beam 4 passes through the polarization beam splitter 13 and then passes through the SLM pixel arrangement 5, and a polarized intensity modulated beam 20, indicative of an image to be projected, is reflected from the polarizing surface of the beam splitter and, while being appropriately magnified by the optics 22, propagates to the screen surface 26. As known to those skilled in the art, a projected image 28 will stay in focus for a large variety of distances between the projecting device 1 and the screen surface 26, due to the nature of the light source and its coherence in the given optical path. Alternatively, when light is not coherent, the focus can be manually adjusted by moving the magnifying lens 22 along the optical path.

As indicated above, the SLM pixel arrangement 5 of the present invention is a multi-layer structure defining the pixel assembly and the lenslet assembly, wherein the lenslet assembly may include one or more micro-lens arrays. The construction of the SLM pixel assembly is known in the art and therefore needs not be specifically described, except to note that it comprises a two-dimensional array of active cells (e.g., liquid crystal cells) formed by LC medium and ITO and TFT layers at opposite sides thereof, each active cell serving as a pixel of the image and being separately operated by the modulation driver 11 to be ON or OFF (or in some cases any level in between) and to perform the polarization rotation of light impinging thereon, thereby enabling to provide a corresponding gray level of the pixel. Some of the cells are controlled to let the light pass therethrough without a change in polarization, while others are controlled to rotate the polarization of light by certain angles, according to the input signal from the driver 11.

Figure 2B:
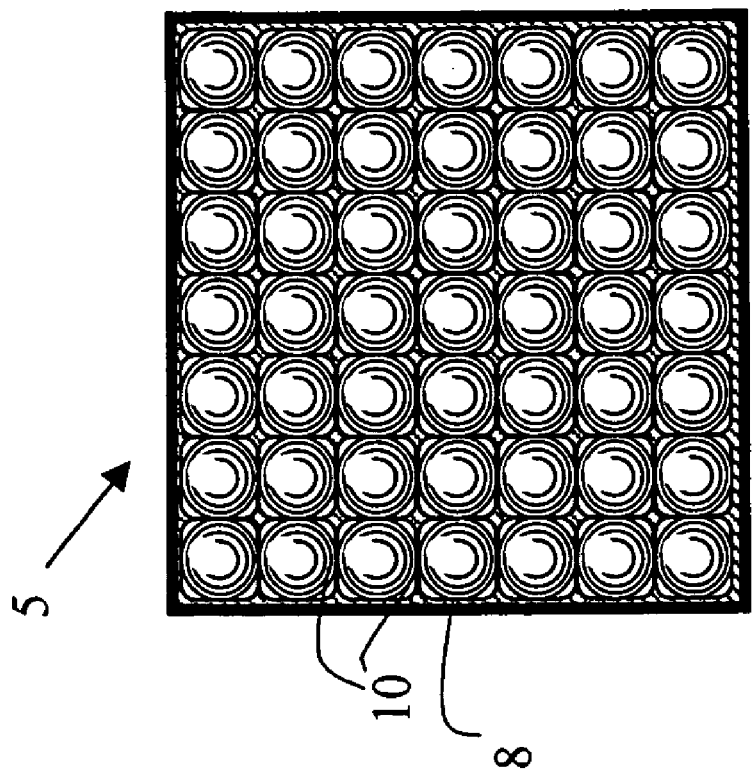
FIG. 2B schematically illustrates a lenslet/microlens array arrangement used in the projecting device of the present invention.
Figure 2A:
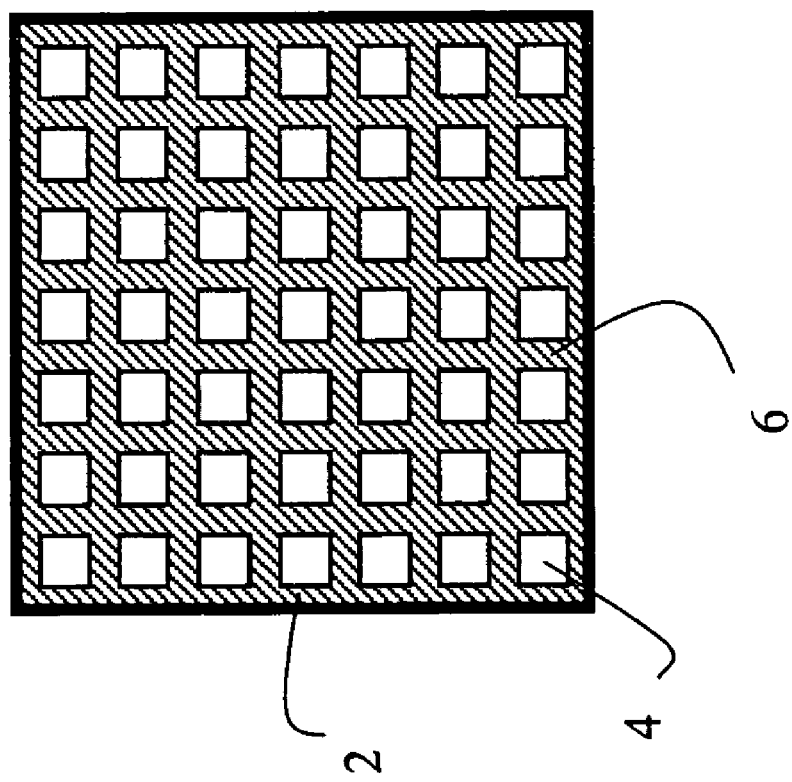
FIG. 2A illustrates the front view of the typical windowed structure of an SLM pixel assembly.

FIG. 2A illustrates the typical pixel assembly 6 of the SLM arrangement, such as a liquid crystal based SLM (e.g., LCOS or AMLCD), suitable to be used in the present invention. The pixel assembly (windowed structure) 6 is a two-dimensional array of spaced-apart cells (active windows) 4 spaced by optically inactive areas generally at 2. Typically, in an AMLCD unit, approximately 40% of the total area is covered by the active windows 4 (fill factor is approximately 40%), and in an LCOS unit, around 70~90% is covered by the active cells, while the rest of the area is the inactive structure 2 that serves for mechanical support and control signals (not shown). In order to preserve the light energy coming into the SLM pixel assembly, it is necessary to piece-wise condense the light through the active windows.

FIG. 2B shows the SLM pixel arrangement 5 according to the present invention. Here, the pixel assembly 6 is associated with the lenslet assembly that includes one or more lenslet arrays 8 accommodated at least upstream of the pixel assembly with respect to the direction of propagation of incoming light, being enclosed between the pixel assembly and the glass substrate. The lenslet array 8 is a two-dimensional array of small lenses 10, useful in piece-wise condensing the incoming light beam. Each of the lenses 10 is optically designed to focus a corresponding light portion of the input beam that impinges on the lens into a small area around the lens' axis, at a distance of a few microns (e.g., 12-15 microns) from the lenslet array. The pitch of the lenslet array is designed to condense the incoming light to match the pitch of the active pixel array. The lens may be of a square shape, so that the lenses are tangent to each other and fill most of the lens array area (fill factor approximately 100%). The lenses can also be of a circular shape. Light condensed into separate focused beamlets pass through the windows of the SLM pixel assembly, each focused beamlet being thereby modulated by the SLM according to the control signal. The optical characteristics of the lens and the distance between the lens and the active pixels are calculated by simple optical methods, to ensure that the diameter of the beamlet spot on the active pixel plane is smaller than the aperture defined by the pixel, thus all the light impinging onto the SLM pixel arrangement passes through the active area of the pixel assembly The following are several examples of the lenslet assembly of the present invention suitable to be used in the SLM pixel arrangement of the device 1, as well as in any other SLM pixel arrangement, either reflective or transmissive.

FIGS. 3A and 3B illustrate two examples of the reflective SLM pixel arrangement utilizing, respectively, AMLCD and LCOS pixel assemblies, utilizing the lenslet assembly 8 formed by a single lenslet array 186. In the example of FIG. 3A, input light beam 184 is projected towards the lenslet array 186 that focuses a plurality of light portions of the input light to a plurality of pixels of the pixel assembly 188. The focused light, while passing through the pixel assembly 188, is modulated according to imaging data and impinges onto a mirror layer 190 located very close to the pixel assembly (a coating on the outer surface 188' of the pixel assembly), thus allowing less heat accumulation over the pixel assembly area. The modulated light is reflected from the layer 190 to propagate along the same optical path backwards to be further directed by the beam splitter (13 in FIG. 1) to the screen surface. In the example of FIG. 3B, an input light beam 192 passes through a lenslet array 194 and is thus focused and condensed towards the center of a liquid crystal pixel of the pixel assembly 196, and is then reflected by A1 mirror electrodes 198 (connected to an active matrix 200) to be output from the SLM pixel arrangement with a polarization opposite to that of the input light 192.

Figure 4B:
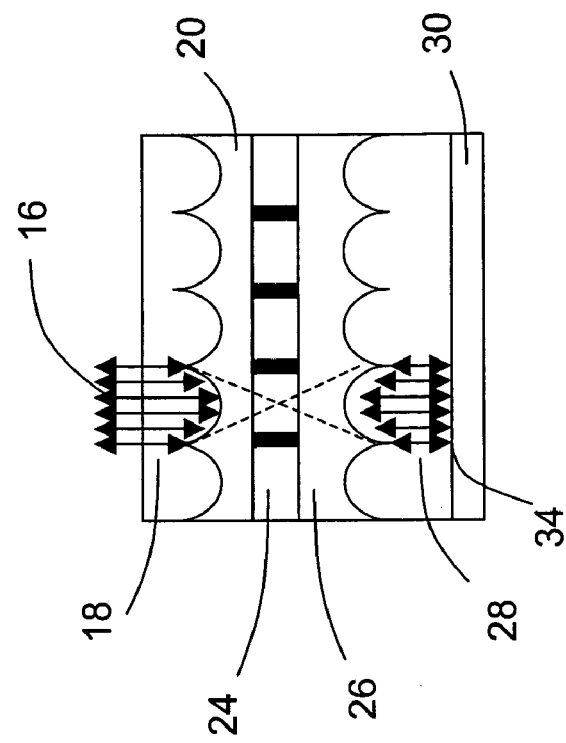
FIGS. 4A and 4B illustrate another example of the SLM pixel arrangement of the present invention utilizing a lenslet assembly including two lenslet arrays at opposite sides of the pixel assembly.
Figure 4A:
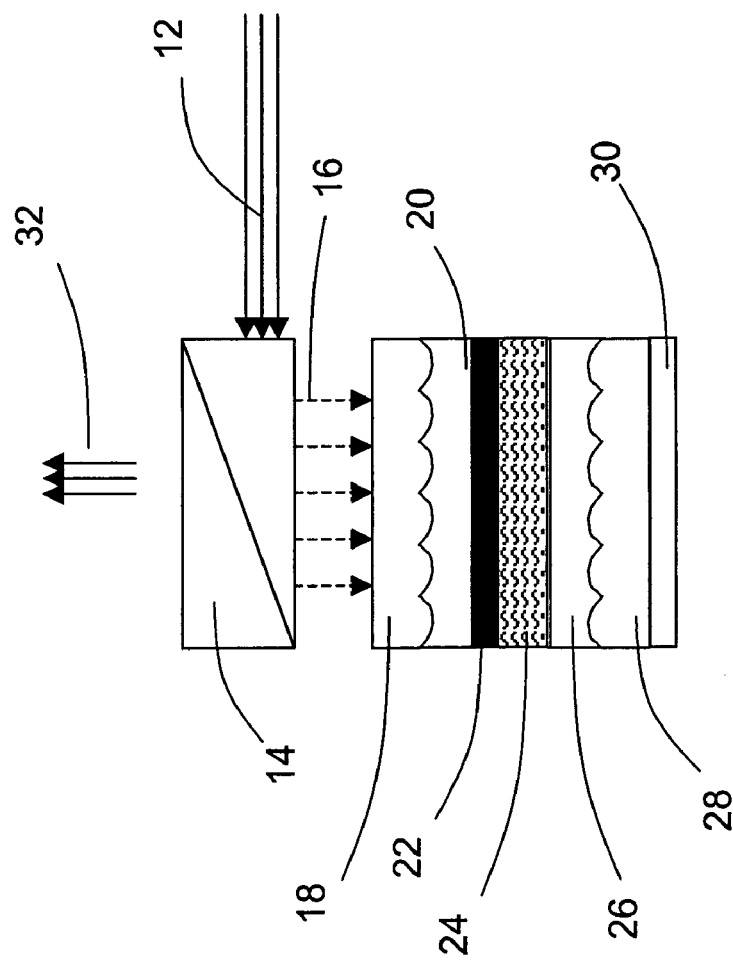

FIG. 4A illustrates another example of the SLM pixel arrangement utilizing a lenslet assembly 8 including two lenslet arrays 20 and 26 at opposite sides, respectively, of the pixel assembly. The SLM pixel arrangement is a multi-layer structure including a liquid crystal cells array 24 with an ITO coating 22; lenslet arrays 20 and 26 interfacing the outer surfaces of the ITO 22 and the LC cells TFT array 24, respectively, the lenslet arrays being made in polymer spacers 18 and 28 respectively; and a reflector layer 30 connected to polymer spacer 28. Each polymer spacer is a multi-layer polymer structure with the lenslet array in the form of a surface relief at the interface between two polymer layers. The SLM pixel arrangement with at least one lenslet assembly may be manufactured using stamping heat/hot embossing, photopolymerization and heat swelling techniques. A polarized input light beam 12 impinges on the polarized beam splitter 14 and is directed (in the present example, reflected from the polarizing surface of the beam splitter) to form a beam 16 that is appropriately condensed and focused by the micro lens array 20 onto the liquid crystal cells array 24 (through the ITO layer 22) preventing any unnecessary light to be dispersed to the inactive matrix area.

As more specifically shown in FIG. 4B, polarized light beam 16 passes the polymer spacer 18 with the lens array 20 therein and is focused to the center pixel arrangement area at the liquid crystal 24 relatively to every pixel, thus improving the fill factor and total efficiency. The light passed through the LC layer 24 is affected by the second lens array 26 made in the polymer spacer 28 to form a parallel beam 34 which is reflected by the mirror layer 30 and returns all the way back to be output from the SLM unit. It should be noted that the mirror layer commonly used in reflective LCDs can be replaced by a coating on the outer surface of the polymer spacer structure 28, thus improving the optical efficiency. The lens array 26 is very similar to the lens array 20, and thus mirrors the optical effect of the lens array 20 causing a reverse optical operation on the beamlets passing through the active pixels. The second lens array 26 diverges the individual beamlets to create a beam of spatially modulated light.

Figures 5A, 5B:
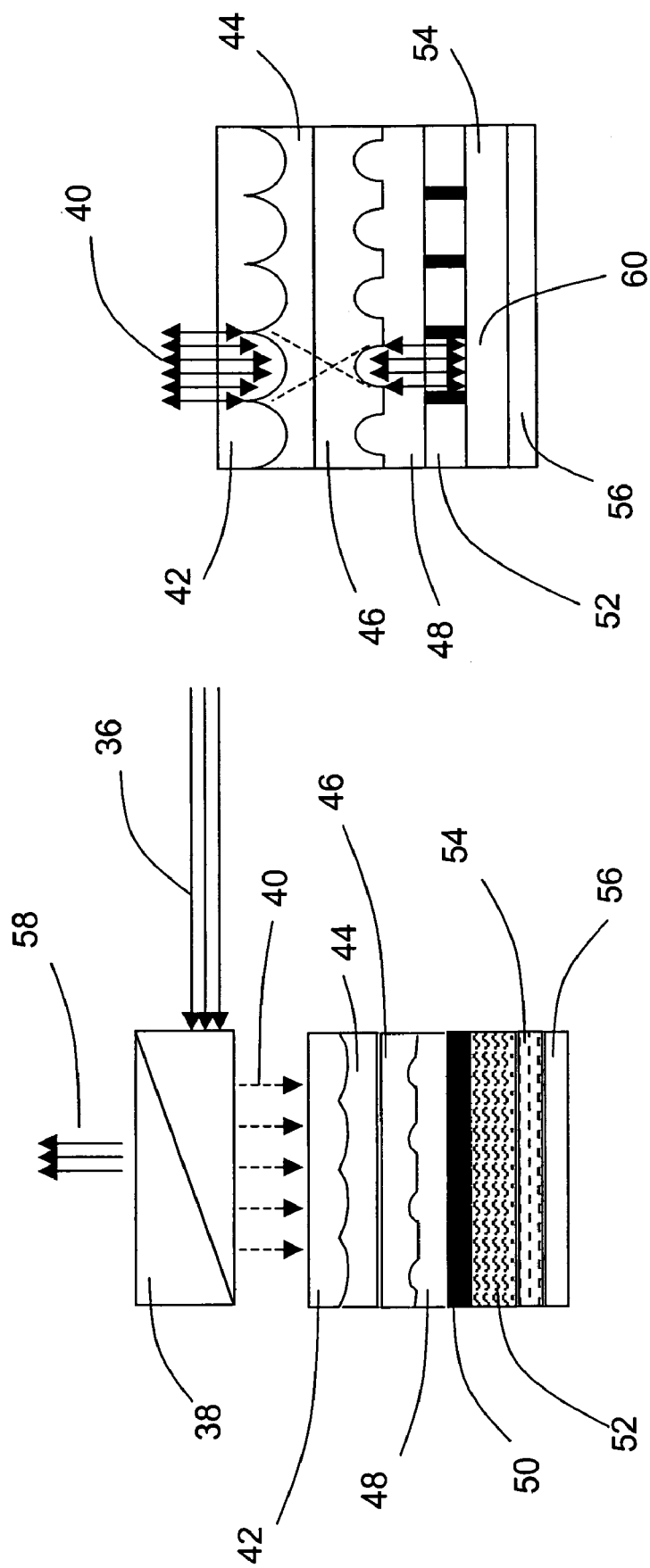
FIGS. 5A and 5B illustrate yet another example of the SLM pixel arrangement utilizing a lenslet assembly of the present invention formed by first and second lenslet arrays at the same side of the pixel assembly.

FIG. 5A illustrates yet another example of the SLM pixel arrangement utilizing a lenslet assembly of the present invention formed by two lenslet arrays 44 and 46 for accommodating in a spaced-apart relationship at the same side of the pixel assembly. In the present example, the pixel assembly is of the LCOS reflective SLM type. As shown in the figure, a polarized light beam 36 enters the SLM unit and is directed by polarization beam splitter 38 to the SLM pixel arrangement. The latter is a multi-layer structure including two adjacent polymer layers 42 defining the lenslet array pattern 44 at the interface between them, two adjacent polymer layers 48 defining the lenslet array pattern 46 at the interface between them, ITO layer 50, liquid crystal cells layer 52, and an A1 mirror electrodes layer 54 connected to active matrix 56. It should be noted that the lenslets 46 and 44 can be made on two opposite sides of a single material layer. The microlens arrays 44 and 46 are preferably spaced from each other a distance equal to a sum of the focal lengths of the lenses 44 and 46. As shown more specifically in FIG. 5B, the beam 40 impinges onto the first lens array 44 and is condensed towards the second lens array 46 that further condenses and focuses the beam portions onto the LC pixels, respectively, and the resulted parallel beams passes through the LC layer 52, resulting in a modulated beam 60 that is reflected by the layer 54 to return back towards the beam splitter. The first lens array 44 contains lenses larger than those of the lens array 46 to thereby ensure focusing the relatively large beam on a small pixel and to thus avoid light dispersing over the inactive area. The dimensions of the lenses and the space between the lenses 44 and 46 are defined by the diameter of the light source beam, the number of pixels and the pitch of the SLM pixel assembly, such that the focal length of the first and second microlens arrays substantially coincide. It should also be noted that the second microlens array can be a diverging lens where the real focal point of the first lens converges with the imaginary focal point of the second lens. An output beam 58 (FIG. 5A) has polarization opposite to that of the input beam 40. It should be noted that, although the use of a polarized light source is preferred (aimed at reducing the number of polarizers in the projecting device), the device can be configured to operate with any type of randomly polarized light source.

The lenses in the second lens array 46, closest to the LC cells array, are of about the pixel's size (typically 12-15 microns) and act as the pixel arrangement from the point of view of the first lens array 44, the lens of the first lens array focusing light to the focal point of the corresponding lens in the second array, which then delivers the beam in a parallel manner through every pixel accordingly. In the pixel array assembly, small gaps exist between each two adjacent pixels. When a projector device opens a large viewing projected screen (such as 100×150 inch), these gaps can be condensed by using the second lens array, which actually enlarges the pixel. This allows a more condensed structure of the array and thus a more unified, less grid noticeable picture when viewed on large projected surfaces.

Figure 5C:
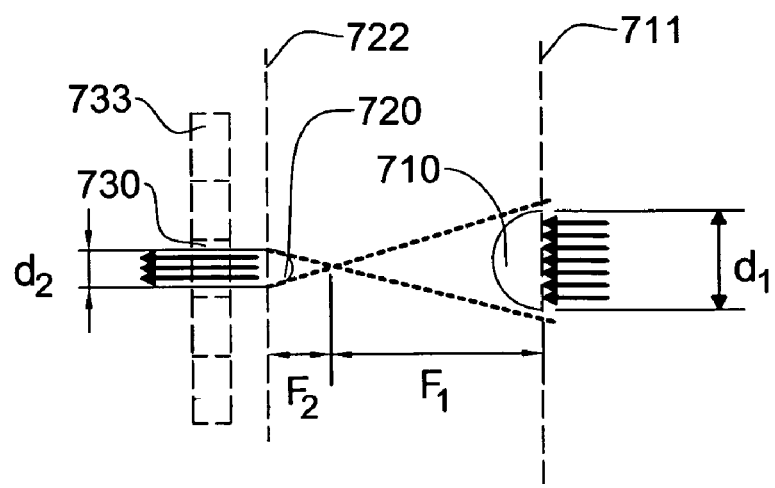
FIG. 5C more specifically illustrates the combined operation of a pair of "large" and "small" lenses of the first and second lenslet arrays, respectively, in the configuration of FIGS. 5A-5B.

Reference is now made to FIG. 5C showing in greater details one lens 710 from the first lenslet array layer 711 and the corresponding lens 720 from the second lenslet array layer 722 (i.e. the layer that is the closest to the pixel array). The width $d_1$ of the lens 710 and the width $d_2$ of the lens 720 are defined, inter alia, by the diameter of the light source beam, the number of the pixels and the pitch of the SLM pixel assembly, such that the back focus $f_1$ of the lens 710 and the front focus $f_2$ of the lens 720 substantially coincide. As indicated above, the second microlens array can be a diverging lens where the real focal point of the first lens 710 converges with the imaginary focal point of the second lens 720. As the lenses 710 are located one adjacent to the other within a layer 711, substantially all the light energy impinging onto the layer 711 is collected by the first lens array 710. The collected light is condensed and focused by each of the lenses 710, and then processed by the second lens array 722 to be directed in parallel light components onto the active surface of the SLM pixel assembly 733 (from which, pixel 730 is shown). In the opposite direction, if needed (for example, in the case of a reflective SLM), the reverse effect is achieved.

Figure 6A:
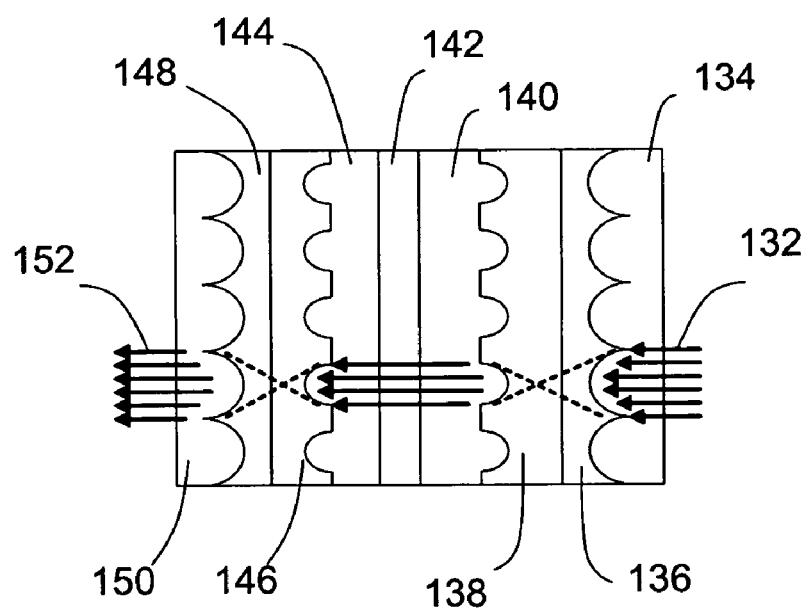
FIGS. 6A and 6B illustrate two more examples, respectively, of the SLM pixel arrangement (reflective or transmissive) utilizing two pairs of lenslet arrays at opposite sides, respectively, of the pixel assembly.
Figure 6B:
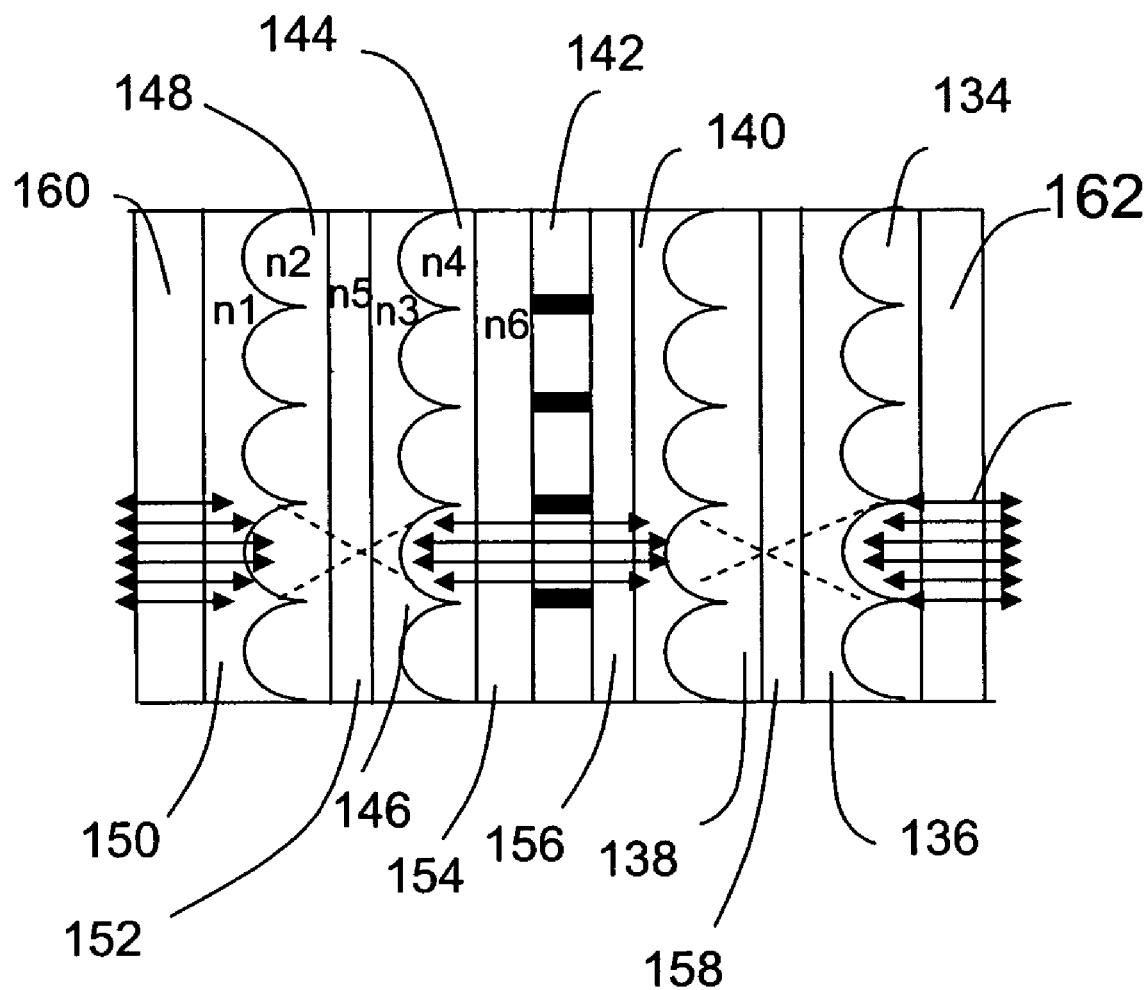

Reference is now made to FIGS. 6A and 6B, showing how the multiple-array lenslet assembly (e.g., those of FIGS. 5A-5B) can be used in a transmissive type SLM pixel arrangement. In these examples, the lenslet assemblies at opposite sides of the pixel assembly are formed by two lenslet arrays, respectively. Two lenslet arrays 148 and 144 are accommodated at one side of the LC cells array 142, and two lenslet arrays 134 and 138 are accommodated at the opposite side of the LC cells array 142. As indicated above, lenslets 134 and 138 can be made on both sides of a single layer. The examples of FIGS. 6A and 6B differ from each in the orientation of the lenslet arrays with respect to each other and with respect to the pixel assembly.

As shown in the example of FIG. 6A, the SLM pixel arrangement is a multi-layer structure formed by a polymer spacer 150 with the lenslet arrays 144 and 148 therein, the pixel assembly structure 142 (LC medium between TFT and ITO layers), a polymer spacer 140 with the lenslet arrays 134 and 138 therein. In this example, the two lenslet assemblies (i.e., two pairs of lenslet arrays 144-148 and 134-138) are oriented in a substantially symmetrical relation with respect to the pixel array plane. Also, in this example lenslet arrays' pairs 144-148 and 134-138 are oriented such that lenses 144 and 148, as well as lenses 134 and 138, face each other by their convex surfaces, and face the respective glass substrate (not shown) and the pixel assembly by their substantially planar surfaces.

As more specifically shown in the example of FIG. 6B, the multi-layer structure of the pixel arrangement is formed by a polymer spacer 154 directly on top of the LC cell on the TFT matrix, lenslet array layer 144, generated on top of the polymer spacer 154, a polymer layer 146 and a polymer spacer 152 between lenslet array layer 144 and the lenslet array 148, a polymer layer 150 on top at the outer layer, and an opposite side of the LC cell the lenslet array layer 134 and 138, between then the polymer layer 136 and the polymer spacer 158, and on top of lenslet array 138 polymer layer 140 and polymer spacer 156 adjacent to the LC cell on the ITO side. This structure is encapsulated in glass substrates 160 and 162 (which is also true for the example of FIG. 6A, although not specifically shown there). In the example of FIG. 6B, the lenslet arrays 144, 148, 134 and 138 are oriented substantially identical, such that lenslet arrays 144 and 148 face the glass substrate 160 by their convex surfaces and the LC matrix (i.e., LC cell with the TFT matrix and ITO layer) by their substantially planar surfaces, while lenslet arrays 134 and 138 faces the LC matrix by their convex surfaces and the respective glass substrate 162 by their substantially planar surfaces.

It should be noted that the case may be such that the refractive index difference between the polymer layers defining the lenslet array (e.g., lens 148 is defined by polymers layers of refractive indices $n_1$ and $n_2$ in FIG. 6B) cannot achieve the focal plane location of lens 148 in between lenses 148 and 144 (and accordingly the same for lenses 134 and 138). In this case, the polymer materials (refractive indices) defining the lenses 134, 138, 144, 148 may be selected such that lens 148 focuses light onto a plane located downstream of the LC matrix, and lens 144 focuses the light impinging thereon onto the plane substantially at the center of the LC matrix. Accordingly, the focal plane of lens 138 is substantially at the center of the LC matrix, while the focal plane of lens 134 is upstream of the LC matrix.

The above configurations enable passing light in a parallel manner through every pixel and avoiding light loss over the grid, thus covering the entire pixel itself and reducing heat accumulation. It should be noted that, generally, only one of the microlens assemblies may be fabricated in a polymer layer structure, while the other may or may not be made in polymer.

Each of the layers in the multi layer structure can have different refractive index. In order to focus light, the following relation between the refractive indices can be used: $n1 < n2$ and n3<n4; n2 n5 n3 and n6 n4. Similar arrangements of refractive indices can be achieved on the opposite side of pixel assembly to achieve the re-parallelizing of the light rays. The refractive index of the lenslet and the spacer materials can be chosen such as to control the focal length of lenses and the focus points.

The lens array(s) assembly of the present invention can be used in any kind of LCOS with reflective/transmissive LCD, and in any color combination scheme (including a three-panel LCD and single panel color LCD with color filters). The lens array can be manufactured using the unique stamping/photo-polymerization/hot-embossing technology, recursively generating the multi layer structure on the TFT substrate or the glass substrate. Also, other suitable known technologies, and any kind of known attachment material can be used, including the creation of the lens arrays on the same substrate. When manufactured on the TFT substrate, the multi-layer structure is adhered to a glass or other substrate in order to remove the thin transparent TFT matrix layer from the otherwise opaque TFT substrate. This removal can be done by gradual thinning of the TFT substrate through chemically assisted polishing of etching or other lift-off/transfer processes, for example such as used by Kopin in the CyberDisplay manufacturing and also Seiko Epson's SUFTLA (Surface-Free process by Laser Annealing and ablation techniques) process presented in SID symposium in May 2000.

Turning back to FIG. 5C, for example, for a transmissive SLM pixel array model Cyber Display Mono 320 (commercially available from Kopin Inc., US) having a 240×320 pixel matrix, and a light source having a 6 millimeter diameter, $d_1$ may be about 15 microns, $d_2$ about 10 micron, $f_1$ about 40 micron and $f_2$ about 20 microns can be used.

Figure 7:
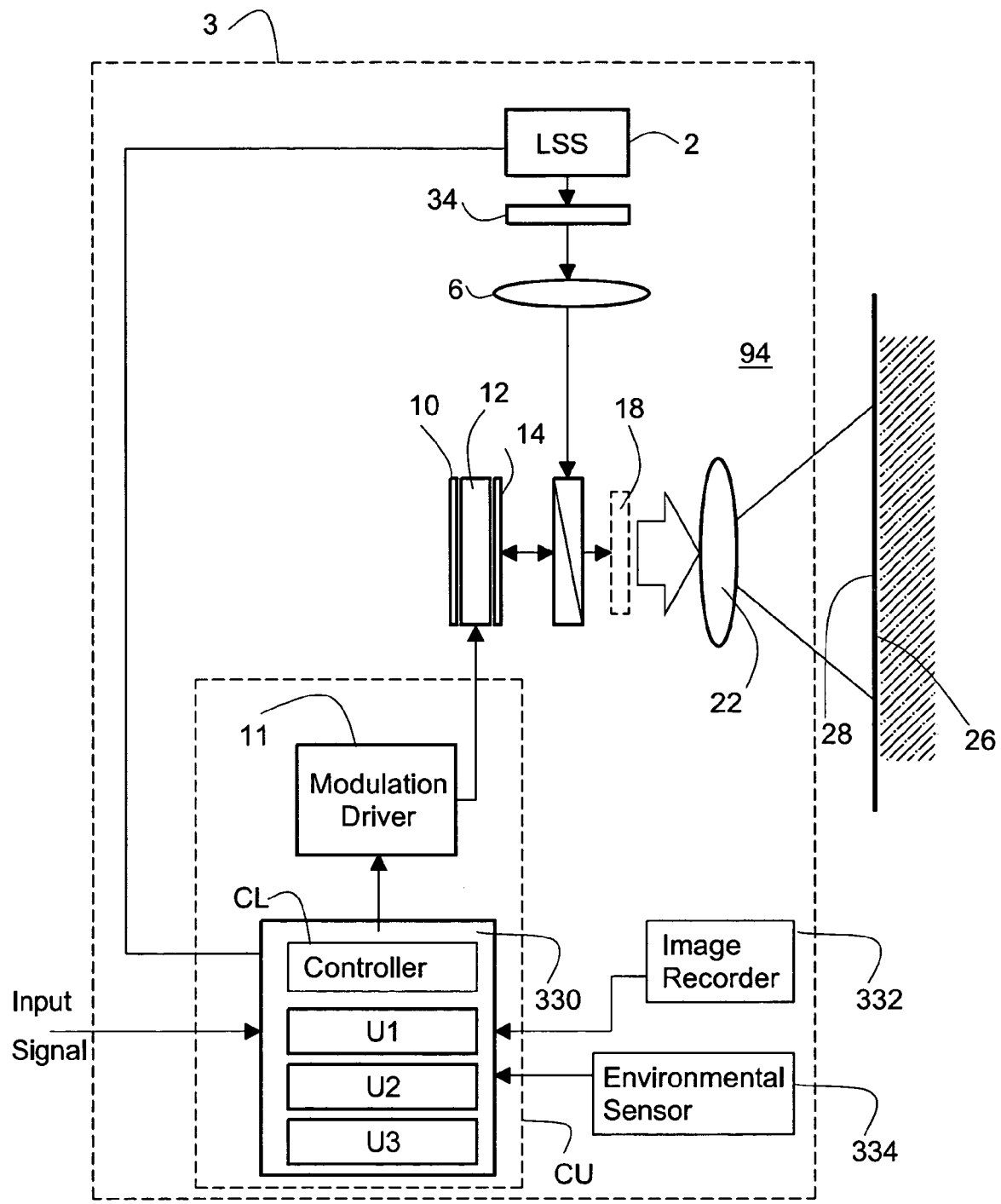
FIG. 7 illustrates a projection system according to the invention comprising an image projector aimed at improving the quality of the projected image and suitable to be used in the projecting device of the present invention.

FIG. 7 illustrates an image projecting device 3 according to another embodiment of the invention. The same reference numbers are used for identifying the common components in devices 1 (FIG. 1) and 3. The device 3 distinguishes from the device 1 in that it additionally comprises a control unit CU (typically a computer device), which, in this specific example, includes the modulation driver 11 and a processor 330 as its constructional parts. The control unit CU thus comprises the driver 11 and the processor 330, and is associated with an image recorder 332 and an environment sensor 334. The driver 11, that generates control signals (modulation signals) to the SLM pixel arrangement, is operable by a signal indicative of the image to be projected ("image signal"). The image signal is generated by an appropriate signaling utility (not shown here) that may and may not be a part of the control unit of the projector device, and may typically be a part of an external computer device (such as PC, phone device, PDA, etc.) where the data to be projected is produced. In this specific example of FIG. 7, the image signal is supplied to the driver 11 through the processor 330, but it should be understood that the image signal can be supplied directly to the driver 11. The image recorder 332 is an imaging device such as a video camera, which is oriented and operable to generate data indicative of the projected image 28. The environment sensor may include one or more sensing units detecting the environment condition of the kind defining the required intensity and/or color mixture of the projecting light, e.g., the light intensity sensor (such as photodetector or a CCD RGB/Temperature single pixel sensor) capable of detecting the intensity of ambient light in the vicinity of the screen surface 26 and generating corresponding data.

The processor 330 includes inter alia a controller CL, and three utility parts (suitable software and/or hardware) $U_1$, $U_2$ and $U_3$ for processing, respectively, the image signal coming from the controller, the data coming from the image recorder, and the data coming from the sensor device. The utility $U_1$ is preprogrammed to analyze the image signal in accordance with the SLM pixel arrangement so as to perform digital image jittering and attenuation (changing of gray levels) on the pixel arrangement (via the driver 11) in order to reduce the effects of speckles in the projected image. The utility $U_2$ is preprogrammed to analyze the data indicative of the projected image 28 and apply a digital processing of the image signal to thereby compensate for the non-uniformity of the light intensity (brightness) within the projected image. The utility $U_3$ is preprogrammed to analyze the data indicative of the environment condition and modulate the laser source 2 accordingly to adjust either the intensity or color mixture, or both. Thus, the provision of the control unit and associated sensor devices (e.g., camera, RGB/Temperature sensor), as well as the digital processing of the image signal, improves the quality of the projected image and the energy efficiency of the projecting device.

The digital compensation of a light modulated image on the target (screen surface) consists of the following. The light modulated image contains non-uniform areas, with over intensive spots of light. A digital mask designed to decrease the light intensity within a specific area is applied to the light modulated image, resulting in a final output image of uniform brightness intensity on the target. A basic calibration procedure of the digital mask consists of the following. The processor 330 (controller CL) receives a pattern-image signal (generated either externally by a video generating device (PC, VCR, etc.) or internally in the controller CL), and generates a control signal indicative of the pattern image. This pattern-image signal is transmitted from the processor to the driver 11 to operate the SLM pixel arrangement accordingly, to enable projection of images with the original non-uniformity in brightness. The light dispersal of the projected images is projected on the screen surface. The digital camera 332, or any other kind of optical recording device, scans the projected image. Digital output data of the camera 332 indicative of the recorded image is received by the utility $U_2$ that analyzes this data and operates together with the controller CL to compare the data indicative of the recorded image with the generated image (created in accordance with the original input signal), and if the images are identical, the calibration result in the form of a final digital mask is generated. If the lack of similarity in the signals is determined, an updated image is generated accordingly to obtain the final digital mask. The controller CL then saves the calibration result (digital mask status) in the driver 11 in order to update the projecting device with the correct parameters of brightness levels. It should be understood that the utility $U_2$ may not be a part of the processor, but may be a stand-alone image processing unit connectable to the image recording device 332 and to the processor 330.

The reduction of the speckle effect appearing in the projected screen, consists of the following. An original projected image appears as an image of a granular nature, the so-called "speckle effect". This effect is observed with highly coherent illumination, when the screen surface is not totally smooth. In order to eliminate this problem, the original image is jittered and the gray level is also attenuated by a maximum displacement of one pixel as it appears in a shifted projected image. Every pixel is jittered and attenuated with such speed that the human eye is unable to notice this effect. For example, an original pixel is jittered to a new position, so that this motion causes the coherence of the illumination to be at least partially destroyed, and the speckles "wash out" during the projecting process, thereby producing a clear (speckle-free) image. Thus, the original image (i.e., the image to be projected) is grabbed from the driver 11 of the SLM, or from the controller CL as the case may be, and is processed by the utility $U_1$. It may resize this image to free active pixel space used for jittering purposes, thus leaving more extra space in the corners and panels of the SLM pixel arrangement. Data indicative of the so-produced resized image is transmitted to the driver 11, where the image is shifted accordingly in a plane along two perpendicular axes by shifting one or more image pixels to be in the pixel areas that were defined as areas not in use, or expendable, and modulated to provide changes in the gray level. By this, a movement of the image on the SLM surface is provided in a high frequency motion, ensuring that the motion remains unnoticeable to the observer, and at the same time, ensuring that the image on the SLM surface moves along the two axes repeatedly, resulting in the reduction of the speckle phenomenon viewed to the observer. It should be noted that such parameters as the frequency of motion, number of shifted pixels, and the step of movement along either one of the two axes or both and the gray level attenuation is controlled by the given algorithm for different outcome results in different given situations.

Figure 8A:
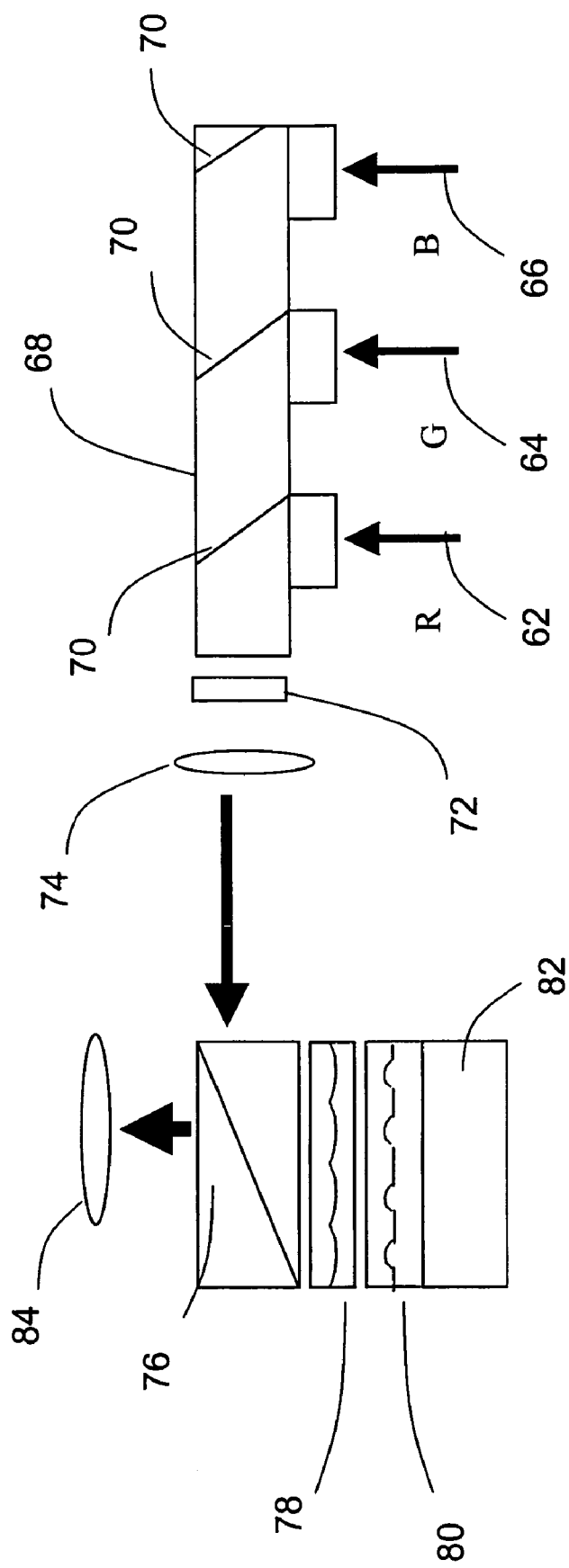
FIGS. 8A and 8B schematically illustrate examples of projection of color images suitable to be used in the device of the present invention.
Figure 8B:
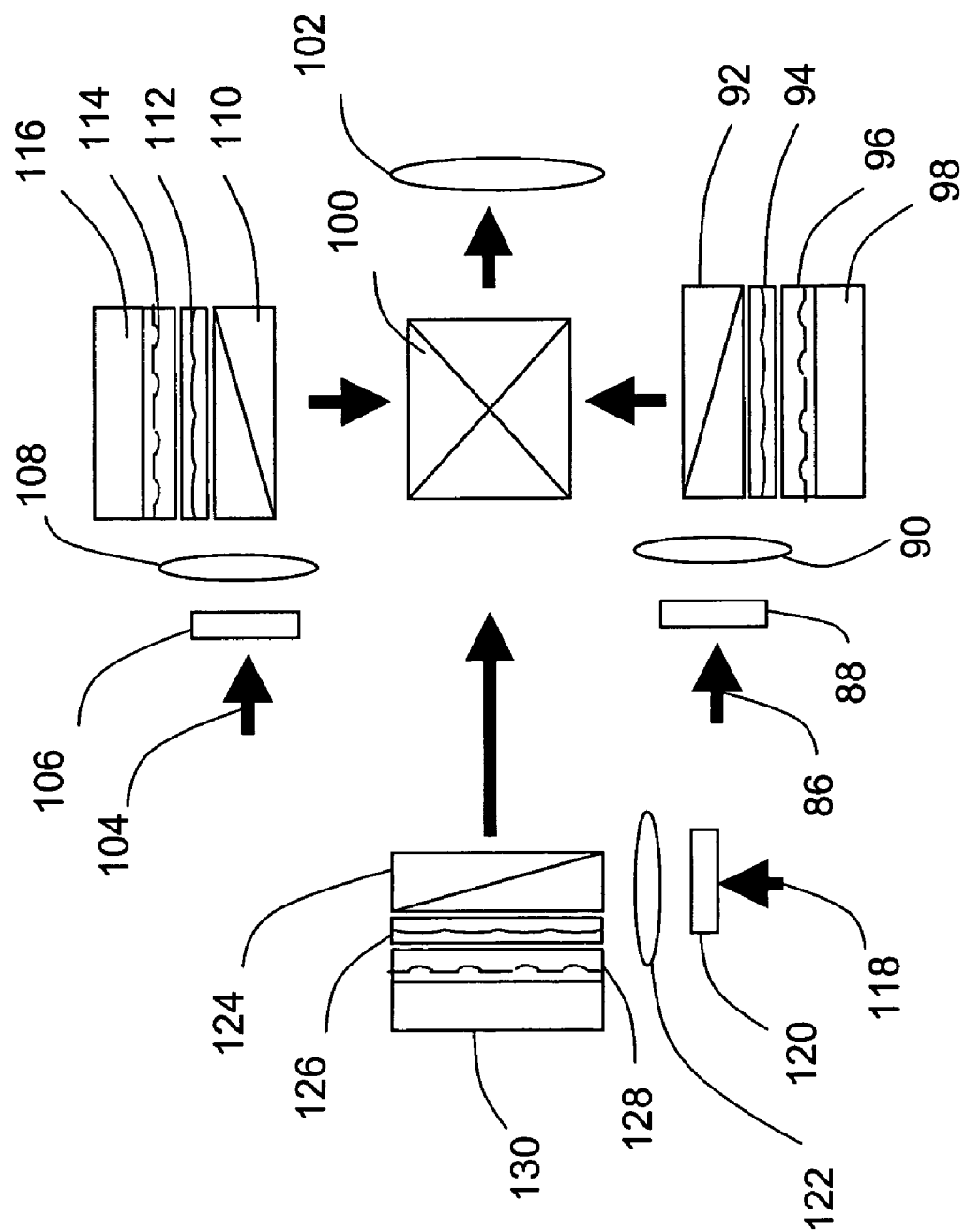

Reference is now made to FIGS. 8A and 8B, schematically illustrating examples of projection of color images suitable for use in the device of the present invention.

FIG. 8A schematically illustrates a reflective projection system architecture using polarized light sources and reflective SLMs of either one of the above-described examples. The so-called mixed sources can be used, where some of the sources are of the polarized kind and the other(s) randomly polarized, for example red- and green-color sources 62 and 64 are polarized sources and a blue-color source 66 is a non-polarized source, and all the sources are mixed to form a colorful projected image. Thus, red-, green-, and blue-color light sources 62, 64 and 66 are polarized/or partially polarized, meaning that some of them are polarized and the rest are not, are directed to a periscope 68. The periscope 68 contains thin film mirrors 70 to thereby allow transparency for given wavelengths and reflect the other wavelengths, thus allowing pointing all three light sources to the same output coordinates. Light, which is being transmitted out of the periscope 68, passes through a diffractive component 72 (top-hat beam shaping optical element), the provision of which is optional and is aimed at converting the Gaussian form of light to a square even light with uniform intensity. The so-processed light then passes through a focusing lens 74 that focuses the light beam in a desired size towards a polarization beam splitter 76 in a manner to cover the entire entrance area of the beam splitter. The polarized beam is directed by the beam splitter 76 (light of a particular polarization is reflected from the polarizing surface) towards a first lens array 78, and is then focused and condensed by a second lens array 80 (to be condensed to a pixel size), and transmitted in a parallel form towards an LC pixel assembly 82. The light beam thus passes through every active pixel relatively, and then, being modulated and reflected back from a back mirror coating (not shown), returns back to the beam splitter 76. As the returned light is polarized opposite to the input light, this returned light passes through the polarizing surface of the beam splitter and is then magnified and projected forward by an imaging lens 84 It should be noted that although the use of a polarized light source is preferred (reducing the number of polarizers), it is not mandatory, and the modulator and system can be used with any kind of non polarized light.

FIG. 8B illustrates another example of a reflective projection system architecture using polarized light sources and the above-described reflective SLMs. A polarized red-color light beam 86 is pointed to a diffractive component 88 (the provision of which is optional) and continues towards a focusing lens 90 that focuses the beam onto a polarization beam splitter 92. The latter rotates the polarized beam towards an SLM pixel arrangement, where the beam passes through a first lens array 94, is further focused and condensed by a second lens array 96 (condensed to a pixel size) and transmitted in a parallel manner towards an LC pixel assembly 98, and is then modulated and reflected back from a back mirror coating towards the beam splitter 92 that transmits the returned light of the opposite polarization (as compared to that of the input light) towards a color combiner cube 100, which delivers the modulated light to an imaging lens 102.

Polarized light 104 from a blue-color light source undergoes similar optical processing while passing through a top-hat beam shaping optical element 106, a focusing lens 108, polarization beam splitter 110, an SLM pixel arrangement (namely, first lens array 112, second lens array 114, and LC 116), passing back through the beam splitter 110, and the color combiner cube 100. Similarly, light 118 produced by a green-color light source propagates towards a focusing lens 122 (e.g., through a top-hat beam shaping optical element 120), and is then appropriately directed by a polarization beam splitter 124 to an SLM pixel arrangement to pass through a first lens array 126, a second lens array 128, and an LC 130, and be reflected back to the beam splitter 124 that transmits the returned light to the color combiner cube 100. The cube 100 combines all three color modulated images and transmits a combined colored image towards the imaging lens 102 to be thereby appropriately magnified and projected onto a screen.

The inventors have found that utilizing a multimode laser as the light source can also reduce such an undesired effect as the speckle creation. This concept consists of the following. Each mode generates an independent speckle pattern. These independent speckle patterns are superimposed such that the integrated speckle pattern provides a smaller speckle-effect compared to that of each separate mode. The result is a clearer projected picture.

The speckle effect can also be reduced by using a time sequential color approach. This can be implemented by using a single common SLM (for example as shown in FIG. 8A), and the sequential pulse mode nature of the lasers' activity. Each laser is pulsed 180 times per second with less than 33% duty cycle. Each pulse has an independent speckle pattern. These patterns are integrated and averaged in time by the human eye, as they are much faster than the 30 Hz sensitivity of the eye, thus further reducing the noticeable speckles. In the three-SLM approach, laser pulses may be used in a similar way, but instead of activating the lasers in sequence they are activated in parallel and generate a similar effect.

Figure 9A:
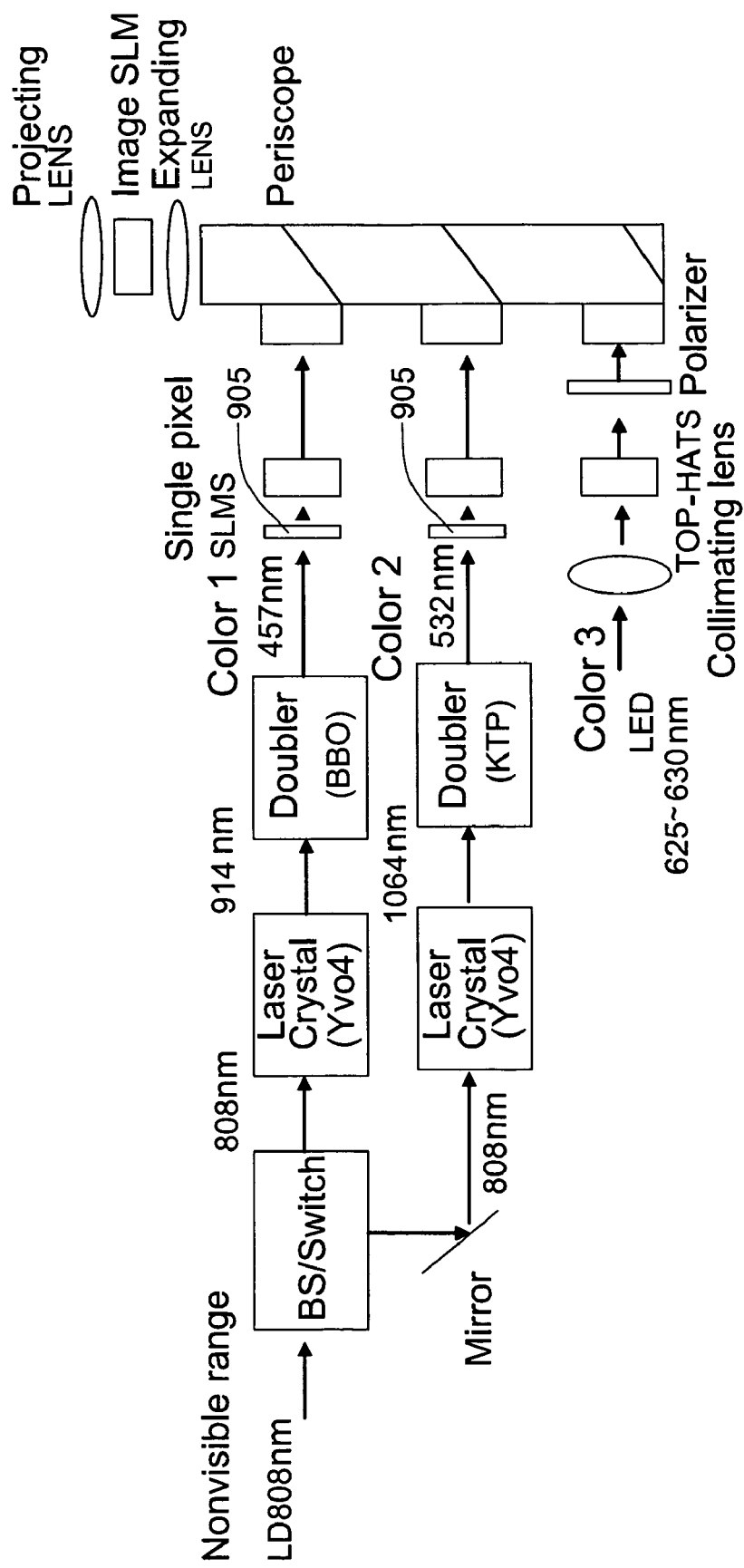
FIGS. 9A and 9B schematically illustrate two examples, respectively, of a mixed type dual sources triple color architecture of the present invention suitable to be used in a projector device, wherein a required number of colors is produced by a lower number of light sources.
Figure 9B:
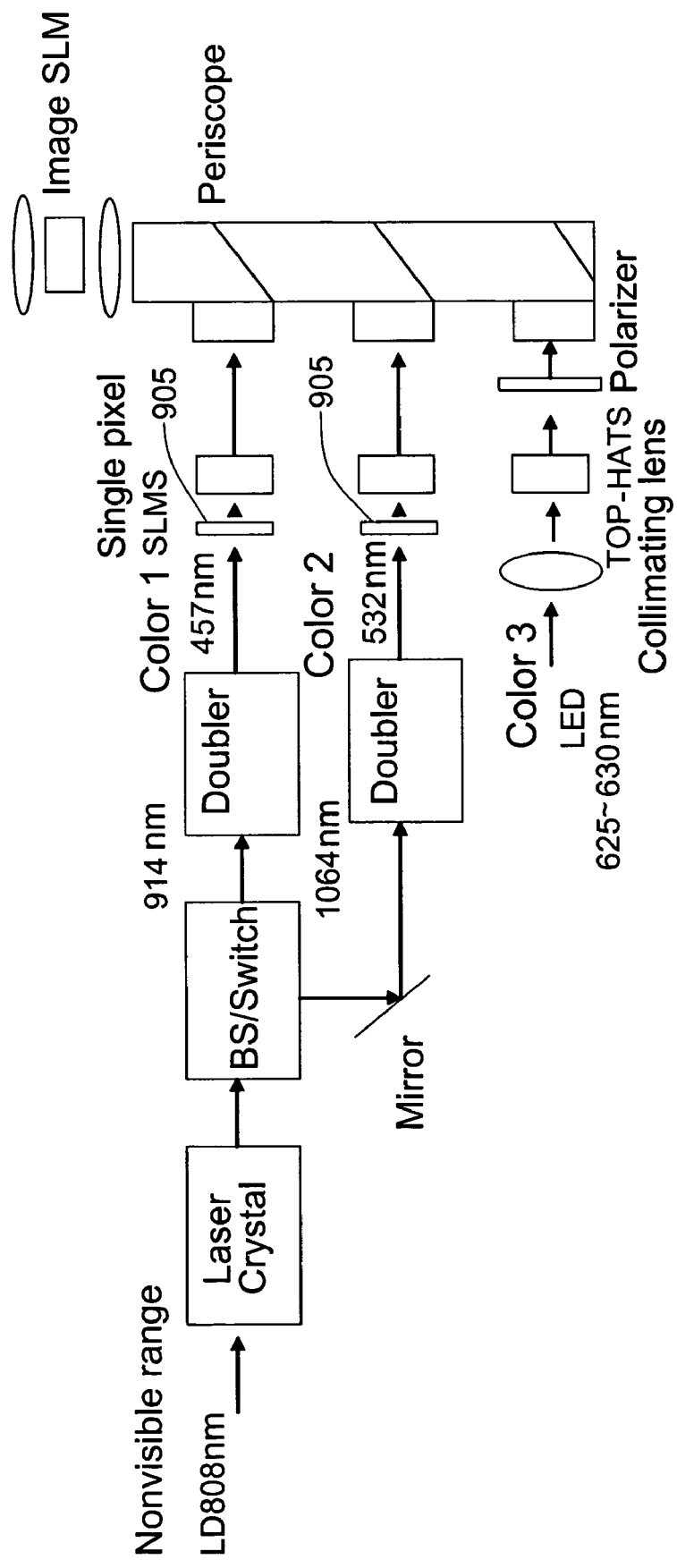

FIGS. 9A and 9B show two examples, respectively, of the device implementation utilizing mixed-type dual-source triple-color architecture. This concept consists of using a lower number of light sources than the number of colors required for producing a colorful image. This can be implemented by using a laser diode emitting in the nonvisible range, and splitting the emitted beam into a few light components to pump a few crystals, respectively, to thereby produce more than one visible wavelength, meaning more than one color. For example, two light sources can be used for delivering three colors (two highly polarized light beams, and one randomly polarized light beam) to thereby allow better optimization for a micro-projector device and also enable reaching a higher polarization ratio for at least two of the delivered colors, thus resulting in an improved quality of the projected image and improved efficiency.

As shown in FIG. 9A, a light beam produced by a 808 nm laser diode passes through a beam splitter BS that splits this beam into two light portions of an appropriate power ratio set so as to allow the right optical output beam of each color (GREEN, BLUE) to be set correctly as required to produce a colorful image. Alternatively, the beam can be switched between two optical paths by a rotating optical switch. The split beam portions propagate towards two laser crystals (e.g., Nd-Yvo4) configured such that the phase match of one of them is set to deliver a light output of 914 nm, and a different phase match of the second one is set to deliver a light output of 1064 nm. The 914 nm beam is pointed towards a doubler (that performs second harmonic generation, SHG), for example a BBO crystal (Barium borate/Beta-barium borate uniaxial crystal), and as a result, a 457 nm (BLUE) output beam of the visible wavelength is produced. The 1064 nm beam is in turn pointed towards a second doubler, for example, KTP crystal (Potassium titanyl Phosphate Biaxial crystal), and thus a 532 nm (GREEN) output beam of the visible wavelength range is produced.

When utilizing the beam splitter BS, the highly polarized beams (BLUE/GREEN) are directed, respectively, towards two single-pixel SLMs (one for each color) that operates as shutters. The beams are then directed towards two top-hat beam shaping diffractive elements, respectively, to transfer the Gaussian shape of the beams to a unified dispersion, and are then delivered towards a periscope.

A second light source used in the system is a LED emitting a RED-color radiation, 625-630 nm. A red light beam is also directed towards a periscope (via collimating lens, top-hat beam shaping diffractive element, and a polarizer).

Thus, the red, blue and green light beams pass through the periscope, and then pass through the common SLM pixel arrangement, which in the present example is of the transmissive type (but can alternatively be reflective). Preferably, the SLM pixel arrangement is constructed as described above: namely, it comprises a lenslet assembly formed by at least one lenslet array, but generally, the mixed color concept of the present invention can advantageously be used with any other known SLM arrangement.

In operation, the LED is appropriately switched, while the laser diode source is operating in CW or quasi CW/pulse mode. The single pixel SLMs designated 905 serve as switches by switching the light passage of the Blue and Green outputs, thus allowing, along with the LED, a color sequence operation. When a switch is used instead of a beam splitter, the shutters 905 are not required.

FIG. 9B shows a somewhat different architecture, in which the beam splitter assembly (or switch) is located downstream to the laser crystal (Nd Yvo4), thus allowing to utilize the single laser crystal for producing a laser beam formed of light components of 914 nm and 1064 nm in wavelength (as well as a 1342 nm component). The splitter assembly BS divides this laser beam into two light beams, and, together with a mirror, directs them to two doublers, respectively, each doubler receiving three-wavelength components. The BBO doubler is sensitive only to the 914 nm component, and the KTP doubler is sensitive to the 1064 nm component. When a switch is used instead of a beam splitter, the single-pixel SLMs (shutters) 905 are not required.

It should be noted that the concept of optimizing the system and reducing the number of optical sources to allow more efficient and reduced power consumption, can be implemented in a different way. For example, RED and GREEN light beams are produced by the laser diode, while the Blue-color light beam is produced by an HB-LED, or all the colors are produced from a single laser diode.

It should also be noted that different types of crystals can be used for the same architecture to allow delivering the same or similar output wavelengths, since more than one type can be fit, and the main difference between different sets of crystals will be their modification set to the system such as size and phase matching, their conversion efficiency and price. Different non-visible range LDs can be used with different wavelengths and with the matching crystals to reach the visible colors required within the same architecture.

The projecting device of the present invention can be used in various applications being connectable to and/or forming part of a computer device, such as a PC, phone device, PDA, etc. For example, the micro-projector device of the present invention can be used with a bidirectional semi-transparent screen of a laptop, enabling content viewing of images on both sides of the screen. To this end, the projector device is connected to a corresponding utility of the laptop to receive an imaging signal and create a projected image onto the screen to be viewed by two observers at opposite sides of the screen at two different angles of observation.

The device of the present invention can be used with the conventional laptop computer while eliminating the need for an LCD screen typically used in these computers. This is achieved by projecting the image with a certain angle of projection onto an external screen surface opposite to the user's eyes, i.e., to be viewed by the user with the certain angle of observation. The projector device can be oriented to project the image onto the table's surface adjacent to the computer, or onto the inner/outer surface of the laptop cover. Thus the user, while working on a portable laptop computer, may advantageously operate with a larger screen, or while operating on a computer with no display at all, can utilize the projector device of the present invention for imaging data on an external surface. It should be understood that such projection of images on an external screen surface can be used with any communication device, e.g., a phone device.

Several micro-projectors of the present invention can operate together to obtain a large projected screen (video wall) by combining several small screens, each being produced by a corresponding micro-projector. In this case, a large image is captured by a video camera and transferred to the processor (image analyzer) which operates to compare data indicative of the large image and data indicative of small images, and produces an output signal to controllers, causing them to reproduce the signal in such a manner that will cause the projectors to present the images in alignment as a whole and seamless. The same configuration can be used to project images onto a concave seamless display of any desired shape, in which case, each projector projects a small image onto a concaved surface to be viewed by an observer as a large concaved seamless image formed by small images partially overlapping each other.

The present invention can be used to project the same image onto the opposite sides of a semi-transparent screen to be viewed by two users, while enabling to image on each of the screen surfaces an image intended for private use by the respective user. In this application, at least two persons communicate face to face with each other around a desk, for example for the purpose of a business discussion or for playing a computerized game. Typically, there is a graphical image that accompanies this communication, and both parties need to see it and contribute to it. Each party would like to keep his own inputs to the joint image in his own custody, for purposes of information security and for easy control. For example, one person has a micro-projecting device associated with a control device and supported by a spatial adjustment device to project an image onto a vertical semi-transparent screen located between the two persons, and the other person uses a similar projecting device oriented and operable to project an image onto the opposite surface of said vertical screen. In other words, beams projected by the two projector devices impinge onto the opposite faces of the screen, and create two different but well registered images, wherein one projector is adjusted to project a mirror image of the data to be imaged, so that both images match each other. Both persons see the same effective image. Each person can modify graphical information on its own projector, to create visual effects such as relationships between a mine and a tank in a war game, a drawing of a building and a layout of water pipes, a map of a city and the layout of a new proposed residential complex, an X-ray of an anatomic organ and a scheme of a planned operation, etc. Registration marks in identical locations at the margins of the images serve to manually register the two images for precise overlapping. This application can be implemented with only one projector as well.

The present invention can be applied for projecting stereo images (it can be a non-stereoscopic projection, yet a retinal one). The use of the micro-projector based on a spatially coherent light source allows obtaining a directional projection of images which cannot be obtained using the common incoherent projection devices. Two coherent projectors of the present invention using laser diodes as their light source are located inside the stereoscopic projector, each device being directed to the user's eyes. The user, due to the human process of interpreting the images that both eyes see, conceives the two separated images to be two projections of a three dimensional object. If the images produced by the two coherent projectors consist of a stereoscopic image, the user will see a three dimensional scene. The scene can be colored and can be dynamic.

Since the laser output is not projected onto a screen but to the user, the use of high optical output power is unnecessary and the optical power used is no more than the optical power which is constantly being used in retinal projection goggles by Microvision Ltd., goggles that are also known to be used in the U.S army.

The importance of using coherent light is associated with the possibility of avoiding light dispersion without the need for controlling this effect, and the possibility of shifting the beam to a desired direction, while any other kind of light would be dispersed.

Stereo images can be produced using a single projector device according to the invention, and a rotating mirror for shifting the beam angle and thereby producing the same effect as obtained with the two projectors.

The present invention can be used with wearable stereoscopic 3D glasses to provide a high efficiency 3D projection of images. In order to produce a stereoscopic 3D image, it is typically required to have two projection channels operable to provide differences between the two images. In most common systems, wearable glasses are used to maintain the required effect. However, the glasses' lack of transmittance causes the degrading of a large portion of light returned to the observer's eye, resulting in the reduction of brightness and a need for a more powerful projector. Using a DLP projector (Digital light processing projector, which is MEMS technology-based) in this specific application, results in a lower efficiency and brightness to the eye of the user as compared to that obtained with an LCD projector, even though that in general, the efficiency on the projected surface itself is higher than that obtained without the 3D glasses. This is due to the fact that the glasses are polarizer based, and since the light coming from an ordinary LCD system is polarized, it passes through the glasses in a more efficient manner without losing as much as if it had come with random polarization, like from a micro-mirror modulator based projector such as a DLP projector, when being reflected from the projected surface towards the observer glasses.

The technique of the present invention provides for improving on the total efficiency of the both known concepts (Ordinary LCD, DMD/DLP), by removing the polarizer in the output side of the SLM unit, thereby having no polarizer at all (considering the use of the polarized light source). Hence, the projection image on the screen surface will not be visible to users who don't wear the glasses and will be shown as a spot of light on the surface. Users who wear the glasses and watch the image, will see the images very clearly, since their glasses function as the polarizer in the output side of the SLM. Consequently, a high brightness, high efficiency image will be obtained on the observer's 3D glasses.

The technique of the present invention provides for efficient use of light sources of limited input energy (for user safety considerations and costs), due to the use of the SLM arrangement including a pixel assembly and a lenslet assembly, as well as due to the use of a highly polarized light source system. These properties can advantageously be used in a micro projector device, since the use of a polarized light source system (i.e., eliminating the need for a separate polarizer), and the use of such a multi-layer SLM structure in a projector device significantly reduces the size of the projector device.

The following are simulation results for a micro-projector according to the present invention, having an intensity of 50 mW at the output of the light source. The micro-projector according to the invention will produce an image having an intensity of 35 mW, delivering 30 lm to the viewers. For a projecting area of about A4 (i.e. 27 cm×20 cm) and at a distance of 60 cm from the projector exit, the power density of the projected image is about 0.065 mW/cm$^2$. This power density is well within the limits of the class 3B laser standard (between 5 mw to 500 mw) for the visible light range (lower than 20 mW/cm$^2$). Known projectors that utilize other techniques such as mirror based scanning type of light modulation, can provide an image having an intensity of 30 lumen very easily; however, the power density will exceed the permitted limit within the given class (in the example of class 3B). In order for such devices to provide power density as required within the class range, the output intensity of the projectors need to be much lower, thus resulting with lower output lumens.

It should be understood that all the functional elements of the device of the present invention as described above in its various implantations can be integrated into a single hybrid component that can become an integral part of a communication and computing device. The invention is suitable to be implemented with multiple light sources in order to produce full color, or by the use of a white light source. The light source can be of any kind, for example a laser diode.

Those skilled in the art will readily appreciate that various modifications and changes can be applied to the embodiments of the invention as hereinbefore exemplified without departing from its scope defined in and by the appended claims.

The invention claimed is:

1. An image projecting device comprising a light source system, a spatial light modulator (SLM) unit, and an image projection optics accommodated at the output side of the SLM unit, wherein the light source system comprises several light sources for generating, respectively, several light beams of different wavelength ranges, at least some of said light sources being highly polarized light sources, the device being configured for projecting a colored image, and having one of the following configurations: (a) comprises a wavelength-selective periscope structure allowing transparency for given wavelengths and reflecting other wavelengths, accommodated between the light source system and the SLM unit; (b) comprises additional SLM units, each in the optical path of the corresponding one of said light beams, and a wavelength combiner accommodated in the optical paths of modulated light beams emerging from the SLM units; and the SLM unit has one of the following configurations:
  (i) said SLM unit includes a pixel array arrangement in the form of a multi-layer structure defining a pixel array assembly and at least one microlens assembly enclosed between two substrates, the microlens assembly being located within a multi-layer polymer spacer structure between the substrate and the pixel assembly and including at least one microlens array accommodated proximate of the pixel array assembly at least upstream thereof with respect to a direction of propagation of light from the light source system towards the SLM unit, and operating to condense and focus incident light onto the pixel array;
  (ii) said SLM unit includes a pixel array assembly and a microlens assembly, the microlens assembly having first and second microlens arrays accommodated in a spaced-apart parallel relationship at least upstream of the pixel array assembly with respect to a direction of propagation of light from the light source system towards the SLM unit and being located within a multi-layer polymer spacer structure between the respective substrate and the pixel assembly, the lenses of said second array located closer to the pixel array assembly being smaller or having different focal length than those of the first array, the lenslet assembly thereby condensing and focusing the incident light to impinge in form of a plurality of parallel light components onto a plurality of pixels, respectively.

2. The device of claim 1, wherein the light source system comprises n light sources and a light converting means in optical path of light generated by the n light sources to thereby produce m light beams of different wavelength ranges, wherein m>n.

3. The device of claim 1, wherein the light source system comprises a multi-mode laser, thereby reducing a speckle effect in an integrated speckle pattern produced by the multiple modes, as compared to that of a single mode.

4. The device according to claim 1, wherein said SLM unit is of a reflective type and comprises a polarization beam splitter/combiner.

5. device according to claim 4, wherein the light source system includes at least one high-ratio polarized light source.

6. The device according to claim 1, wherein the first and second microlens arrays at the same side of the pixel array assembly are spaced from each other a distance equal to a sum of focal lengths of the lenses of the first and second lens arrays.

7. The device according to claim 1, wherein the incident light impinging on to the pixel array assembly is specifically polarized, the device comprising a polarizer unit accommodated at the output side of the pixel arrangement and having a preferred orientation of a plane of polarization so as to be either substantially the same as of the incident light beam or a 90-degree rotated with respect to that of the incident light beam.

8. The device according to claim 7, having one of the following configurations: (a) the light source system includes at least one high-ratio polarized light source; (b) an input polarizer is provided at the input side of the pixel assembly.

9. The device according to claim 1, wherein the light source system comprises an optical arrangement operable to provide substantially uniform intensity distribution within the cross-section of the incident light beam.

10. The device according to claim 9, wherein said optical arrangement includes a diffractive element operable to modify the beam intensity distribution to produce the substantially uniform intensity distribution of the beam within its cross-section.

11. The device according to claim 1 wherein the light source system includes a beam expander affecting the cross section of a light beam generated by the light source system to provide the cross section of the beam substantially of the size of an active surface of the SLM pixel arrangement.

12. The device according to claim 1, wherein the light source system includes a light source generating a light beam of the cross section substantially of the size of the active surface of the SLM pixel arrangement.

13. The device according to claim 1, wherein the microlens assembly comprises first and second similar microlens arrays having one of the following configurations: (a) said first and second similar microlens arrays are configured at opposite sides of the pixel array assembly, respectively, such that each lens in the first array is associated with a corresponding pixel of the pixel array and with the corresponding lens in the second array, each lens being substantially of the pixel size; and (b) said first and second similar microlens arrays are configured in a spaced-apart parallel relationship upstream of the pixel array assembly, the lenses of the second array located closer to the pixel array assembly being smaller or having different focal length than those of the first lens array.

14. The device according to claim 1, wherein the lenses of the second array closer to the pixel array are substantially of the pixel size.

15. The device according to claim 1, wherein the SLM unit is transmissive, and said pixel arrangement comprises an additional microlens assembly formed by an additional pair of microlens arrays accommodated in a spaced-apart parallel relationship at the opposite side of the pixel array assembly.

16. The device of claim 15, wherein the two pairs of the microlens arrays are oriented substantially symmetrically identical with respect to the pixel assembly; or oriented substantially identical to each other.

17. The device of claim 16, wherein the microlens arrays at one side of the pixel assembly face each other by their convex surfaces.

18. The device of claim 16, wherein the microlens arrays at one side of the pixel assembly face the respective substrate of the SLM unit by their convex surfaces and face the pixel assembly by their substantially planar surfaces; and the microlens arrays at the other side of the pixel assembly face the pixel assembly by their convex surfaces and face the other substrate by their substantially planar surfaces.

19. The device according to claim 15, wherein the lenses of the array closer to the pixel array assembly are substantially of the pixel size.

20. An image projecting device comprising a light source system, a spatial light modulator (SLM) unit, and an image projection optics accommodated at the output side of the SLM unit, wherein
  the light source system comprises n light sources and a light converting means to thereby produce m light beams of different wavelength ranges, wherein m>n, the device being configured for projecting a colored image, and having one of the following configurations: (a) comprises a wavelength-selective periscope structure allowing transparency for given wavelengths and reflecting other wavelengths, accommodated between the light source system and the SLM unit; (b) comprises additional SLM units, each in the optical path of the corresponding one of said light beams, and a wavelength combiner accommodated in the optical paths of modulated light beams emerging from the SLM units;

the light source system has one of the following configurations: (a) comprises a laser diode emitting a light beam of the non-visible range, said light converting means comprising a splitter assembly for splitting said emitted light beam into at least two spatially separated light components, at least two crystals accommodated so as to be pumped by said at least two light components to produce two light beams, respectively, of different wavelengths and different from those of the pumping light components, and an assembly operable apply harmonic generation to said two light beams, to thereby produce two light outputs of different wavelengths in the visible range; (b) comprises a laser diode emitting a light beam including at least two light components of different wavelengths within the non-visible range, said light converting means comprising a splitter assembly for spatially separating said at least two light components of the emitted light beam and an assembly operable to apply second harmonic generation to said at least two light components, to thereby produce at least two light outputs of different wavelengths in the visible range;

the SLM unit has one of the following configurations: (i) includes a pixel array arrangement in the form of a multi-layer structure defining a pixel array assembly and at least one microlens assembly enclosed between two substrates, the microlens assembly being located within a multi-layer polymer spacer structure between the substrate and the pixel assembly and including at least one microlens array accommodated proximate of the pixel array assembly at least upstream thereof with respect to a direction of propagation of light from the light source system towards the SLM unit, and operating to condense and focus incident light onto the pixel array; and (ii) includes a pixel array assembly and a microlens assembly, the microlens assembly having first and second microlens arrays accommodated in a spaced-apart parallel relationship at least upstream of the pixel array assembly with respect to a direction of propagation of light from the light source system towards the SLM unit and being located within a multi-layer polymer spacer structure between the respective substrate and the pixel assembly, the lenses of said second array located closer to the pixel array assembly being smaller or having different focal length than those of the first array, the lenslet assembly thereby condensing and focusing the incident light to impinge in form of a plurality of parallel light components onto a plurality of pixels, respectively.

21. The device according to claim 20, wherein said splitter assembly has one of the following configurations:
comprises a beam splitter and a mirror; or comprises an optical switch.

22. The device according to claim 20, wherein said assembly operable to apply harmonic generation comprises at least two crystals.

23. A method for projecting a colored image, the method comprising: producing several incident light beams of several different wavelength ranges, at least one of the incident beams having a predetermined cross section corresponding to a size of an active surface of a spatial light modulator (SLM) unit defined by its pixel array assembly, and passing these incident light beams, on their ways to the SLM pixel arrangement, through a wavelength-selective periscope structure allowing transparency for given wavelengths and reflecting other wavelengths; operating the pixel assembly with an imaging signal representative of an image to be projected, thereby causing modulation of the light passing through the pixel assembly; passing the modulated light through an image projecting optics to a projecting surface; the method further comprising carrying out one of the following:

(a) passing said incident light beams, while propagating towards the pixel array assembly inside the SLM unit, and the modulated light, while propagating from the pixel array assembly inside the SLM unit, through at least one microlens array that condenses and focuses a plurality of light components of the incident light to the centers of a plurality of said pixels, respectively, and converts the condensed beams of the modulated light the pixel array assembly into substantially parallel beams, said at least one microlens assembly being located within a pixel array assembly of the SLM unit such that said at least one microlens assembly is made in a polymer spacer between the pixel assembly and a glass substrate of the SLM unit;

(b) said incident light beam, propagating towards the pixel array assembly, passes through first and second microlens arrays accommodated in a spaced-apart parallel relationship being made in a polymer spacer between the pixel assembly and a glass substrate of the SLM unit, wherein the lenses of said second array located closer to the pixel array assembly are smaller or have different focal length than those of the first array, the incident light being thereby condensed and focused to impinge onto a plurality of pixels in form of a plurality of parallel light components, respectively.

24. A method for projecting a colored image, the method comprising: producing several incident light beams of several different wavelength ranges, at least one of the incident beams having a predetermined cross section corresponding to a size of an active surface of a spatial light modulator (SLM) unit defined by its pixel array assembly, passing these light beams through the SLM units, respectively, and passing the modulated light beams through a wavelength combiner; operating the pixel assembly with an imaging signal representative of an image to be projected, thereby causing modulation of the light passing through the pixel assembly; passing the modulated light through an image projecting optics to a projecting surface; the method further comprising carrying out one of the following:

(a) passing said incident light beams, while propagating towards the pixel array assembly inside the SLM unit, and the modulated light, while propagating from the pixel array assembly inside the SLM unit, through at least one microlens array that condenses and focuses a plurality of light components of the incident light to the centers of a plurality of said pixels, respectively, and converts the condensed beams of the modulated light the pixel array assembly into substantially parallel beams, said at least one microlens assembly being located within a pixel array assembly of the SLM unit such that said at least one microlens assembly is made in a polymer spacer between the pixel assembly and a glass substrate of the SLM unit;

(b) said incident light beam, propagating towards the pixel array assembly, passes through first and second microlens arrays accommodated in a spaced-apart parallel relationship being made in a polymer spacer between the pixel assembly and a glass substrate of the SLM unit, wherein the lenses of said second array located closer to the pixel array assembly are smaller or have different focal length than those of the first array, the incident light being thereby condensed and focused to impinge onto a plurality of pixels in form of a plurality of parallel light components, respectively.

25. The method according to claim 24, wherein at least some of said light beams are highly polarized light beams.

26. A method for projecting an image comprising:
creating m light beams of different wavelength ranges by a light source system including n light sources and a light converting means in optical path of light generated by the n light sources, wherein m>n, said creating comprising emitting a light beam of the non-visible range, and converting said light beam into at least two light beams of different wavelengths in the visible range, at least one of said m light beams having a predetermined cross section corresponding to a size of an active surface of a spatial light modulator (SLM) unit defined by its pixel array assembly, and directing the incident light towards the pixel array assembly; operating the pixel assembly with an imaging signal representative of an image to be projected, thereby causing modulation of the light passing through the pixel assembly; passing the modulated light through an image projecting optics to a projecting surface; the method further comprising carrying out one of the following:
(a) passing said incident light beam, while propagating towards the pixel array assembly inside the SLM unit, and the modulated light, while propagating from the pixel array assembly inside the SLM unit, through at least one microlens array that condenses and focuses a plurality of light components of the incident light to the centers of a plurality of said pixels, respectively, and converts the condensed beams of the modulated light the pixel array assembly into substantially parallel beams, said at least one microlens assembly being located within a pixel array assembly of the SLM unit such that said at least one microlens assembly is made in a polymer spacer between the pixel assembly and a glass substrate of the SLM unit;
(b) said incident light beam, propagating towards the pixel array assembly, passes through first and second microlens arrays accommodated in a spaced-apart parallel relationship being made in a polymer spacer between the pixel assembly and a glass substrate of the SLM unit, wherein the lenses of said second array located closer to the pixel array assembly are smaller or have different focal length than those of the first array, the incident light being thereby condensed and focused to impinge onto a plurality of pixels in form of a plurality of parallel light components, respectively.

27. The method according to claim 26, wherein said converting comprises splitting said emitted light beam into at least two spatially separated light components for pumping at least two laser crystals, respectively, to thereby produce two light beams, respectively, of different wavelengths and different from those of the pumping light components, and applying harmonic generation to said two light beams to produce two light outputs of different wavelengths in the visible range.

28. The method according to claim 26, wherein said emitted light beam includes at least two light components of different wavelengths within the non-visible range, said converting comprises spatially separating said at least two light components of the emitted light beam and applying second harmonic generation to said at least two light components, to thereby produce at least two light outputs of different wavelengths in the visible range.

29. The method according to claim 26, wherein a speckle effect in a projected image is reduced by using a multi-mode laser for the creation of said at least one incident light beam and by sequentially pulsing the laser light source while creating the incident light beam, such that independent speckle patterns of the pulses result in an integrated speckle pattern of the projected image that is time averaged by a human eye faster than the human eye sensitivity.

30. An image projecting device comprising a light source system, a spatial light modulator (SLM) unit, and an image projection optics accommodated at the output side of the SLM unit, wherein
the light source system comprises at least one highly polarized light source and a randomly polarized light source; and
the SLM unit has one of the following configurations:
(i) said SLM unit includes a pixel array arrangement in the form of a multi-layer structure defining a pixel array assembly and at least one microlens assembly enclosed between two substrates, the microlens assembly being located within a multi-layer polymer spacer structure between the substrate and the pixel assembly and including at least one microlens array accommodated proximate of the pixel array assembly at least upstream thereof with respect to a direction of propagation of light from the light source system towards the SLM unit, and operating to condense and focus incident light onto the pixel array;
(ii) said SLM unit includes a pixel array assembly and a microlens assembly, the microlens assembly having first and second microlens arrays accommodated in a spaced-apart parallel relationship at least upstream of the pixel array assembly with respect to a direction of propagation of light from the light source system towards the SLM unit and being located within a multi-layer polymer spacer structure between the respective substrate and the pixel assembly, the lenses of said second array located closer to the pixel array assembly being smaller or having different focal length than those of the first array, the lenslet assembly thereby condensing and focusing the incident light to impinge in form of a plurality of parallel light components onto a plurality of pixels, respectively.

31. The device according to claim 30, wherein the light source system comprises at least one LED.

32. An image projecting device comprising a light source system including at least one high-ratio polarized light source, a spatial light modulator (SLM) unit, and an image projection optics accommodated at the output side of the SLM unit, the device being characterized in that said SLM unit is of a reflective type and comprises a polarization beam splitter/combiner, the device having at least one of the following configurations:
(i) said SLM unit includes a pixel array arrangement in the form of a multi-layer structure defining a pixel array assembly and at least one microlens assembly enclosed between two substrates, the microlens assembly including at least one microlens array accommodated proximate of the pixel array assembly at least upstream thereof with respect to a direction of propagation of light from the light source system towards the SLM unit, and operating to condense and focus incident light onto the pixel array;
(ii) said SLM unit including a pixel array assembly and a microlens assembly, the microlens assembly having first and second microlens arrays accommodated in a spaced-apart parallel relationship at least upstream of the pixel array assembly with respect to a direction of propagation of light from the light source system towards the SLM unit, the lenses of said second array located closer to the pixel array assembly being smaller or having different focal length than those of the first array, the lenslet assembly thereby condensing and focusing the incident light to impinge in form of a plurality of parallel light components onto a plurality of pixels, respectively;

(iii) the light source system comprises n light sources and a light converting means in optical path of light generated by the n light sources to thereby produce m light beams of different wavelength ranges, wherein m>n;

(iv) the light source system comprises a multi-mode laser, thereby reducing a speckle effect in an integrated speckle pattern produced by the multiple modes, as compared to that of a single mode;

(v) the light source system comprises at least one highly polarized light source and a randomly polarized light source.

33. The device according to claim 32, wherein the light source system comprises at least one LED.

34. The device of claim 32, wherein the microlens assembly is located within a polymer spacer between the substrate and the pixel assembly.

35. The device of claim 32, wherein the microlens assembly is located within a polymer spacer between the substrate and the pixel assembly, the polymer spacer being a multi-layer structure.

36. The device of claim 32, wherein the microlens assembly is located within a multi-layer polymer structure between the substrate and the pixel assembly, the microlens array being defined as a surface relief at an interface between two polymer layers.

37. A method for projecting a colored image, the method comprising creating incident light beams of different wavelength ranges by at least one-highly polarized light source and a randomly-polarized light source, at least one of the incident light beams having a predetermined cross section corresponding to a size of an active surface of a spatial light modulator (SLM) unit defined by its pixel array assembly, and directing the incident light towards the pixel array assembly; operating the pixel assembly with an imaging signal representative of an image to be projected, thereby causing modulation of the light passing through the pixel assembly; passing the modulated light through an image projecting optics to a projecting surface; the method further comprising carrying out one of the following:

(a) passing said incident light beam, while propagating towards the pixel array assembly inside the SLM unit, and the modulated light, while propagating from the pixel array assembly inside the SLM unit, through at least one microlens array that condenses and focuses a plurality of light components of the incident light to the centers of a plurality of said pixels, respectively, and converts the condensed beams of the modulated light the pixel array assembly into substantially parallel beams, said at least one microlens assembly being located within a pixel array assembly of the SLM unit such that said at least one microlens assembly is made in a polymer spacer between the pixel assembly and a glass substrate of the SLM unit;

(b) said incident light beam, propagating towards the pixel array assembly, passes through first and second microlens arrays accommodated in a spaced-apart parallel relationship being made in a polymer spacer between the pixel assembly and a glass substrate of the SLM unit, wherein the lenses of said second array located closer to the pixel array assembly are smaller or have different focal length than those of the first array, the incident light being thereby condensed and focused to impinge onto a plurality of pixels in form of a plurality of parallel light components, respectively.

38. The device according to claim 37, wherein the light source system comprises at least one LED.

39. A method for projecting a colored image, the method comprising: creating incident light beams of different wavelength ranges by at least one-highly polarized light source and a randomly-polarized light source, at least one of the incident light beams having a predetermined cross section corresponding to a size of an active surface of a reflective spatial light modulator (SLM) unit defined by its pixel array assembly, and directing the incident light towards the pixel array assembly; operating the pixel assembly with an imaging signal representative of an image to be projected, thereby causing modulation of the light passing through the pixel assembly; passing the modulated light through an image projecting optics to a projecting surface; the method comprising passing the incident light beam propagating towards the pixel array assembly and the reflected modulated light emerging from the pixel array assembly, through a polarization beam splitter, the method further comprising carrying out at least one of the following, (a) passing said incident light beam, while propagating towards the pixel array assembly inside the SLM unit, and the modulated light, while propagating from the pixel array assembly inside the SLM unit, through at least one microlens array that condenses and focuses a plurality of light components of the incident light to the centers of a plurality of said pixels, respectively, and converts the condensed beams of the modulated light the pixel array assembly into substantially parallel beams;

(b) said incident light beam, propagating towards the pixel array assembly, passes through first and second microlens arrays accommodated in a spaced-apart parallel relationship, wherein the lenses of said second array located closer to the pixel array assembly are smaller or have different focal length than those of the first array, the incident light being thereby condensed and focused to impinge onto a plurality of pixels in form of a plurality of parallel light components, respectively.

40. The method of claim 39, wherein said passing of the incident and modulated light through at least one microlens assembly comprises providing said at least one microlens assembly within a pixel array arrangement of the SLM unit such that said at least one microlens assembly is made in a polymer spacer between the pixel assembly and a glass substrate of the SLM unit.

41. The method of claim 39, wherein m light beams of different wavelength ranges are created by a light source system including n light sources and a light converting means in optical path of light generated by the n light sources, wherein m>n.

42. The method of claim 39, wherein a speckle effect in a projected image is reduced by using a multi-mode laser for the creation of said at least one incident light beam.

43. The device according to claim 39, wherein the light source system comprises at least one LED.

44. The method of claim 43, wherein said incident light beam, propagating towards the pixel array assembly, passes through two first microlens arrays accommodated in a spaced-apart parallel relationship, wherein the lenses of the microlens array located closer to the pixel array assembly are smaller or have different focal length than those of the other of said two first microlens array, the incident light being thereby condensed and focused to impinge onto a plurality of pixels in form of a plurality of parallel light components, respectively.

45. The method of claim 44, wherein m light beams of different wavelength ranges are created by a light source system including n light sources and a light converting means in optical path of light generated by the n light sources, wherein m>n.

46. The method of claim 44, wherein a speckle effect in a projected image is reduced by using a multi-mode laser for the creation of said at least one incident light beam.

47. The method of claim 44, wherein a colored image is projected by creating the incident light beams of different wavelength ranges by at least one-highly polarized light source and a randomly-polarized light source.

48. The device according to claim 47, wherein the light source system comprises at least one LED.

49. A method for projecting a colored image, the method comprising: creating incident light beams of different wavelength ranges by at least one-highly polarized light source and a randomly-polarized light source, at least one of the incident light beams having a predetermined cross section corresponding to a size of an active surface of a spatial light modulator (SLM) unit defined by its pixel array assembly, and directing the incident light towards the pixel array assembly; operating the pixel assembly with an imaging signal representative of an image to be projected, thereby causing modulation of the light passing through the pixel assembly; passing the modulated light through an image projecting optics to a projecting surface; the method comprising providing specific polarization of the incident light, and passing the modulated light emerging from the SLM pixel arrangement through a polarizer having a preferred orientation of a plane of polarization so as to be either substantially the same as of the incident light beam or a 90-degree rotated with respect to that of the incident light beam, the method further comprising carrying out at least one of the following:
  (a) passing said incident light beam, while propagating towards the pixel array assembly inside the SLM unit, and the modulated light, while propagating from the pixel array assembly inside the SLM unit, through at least one microlens array that condenses and focuses a plurality of light components of the incident light to the centers of a plurality of said pixels, respectively, and converts the condensed beams of the modulated light the pixel array assembly into substantially parallel beams;
  (b) said incident light beam, propagating towards the pixel array assembly, passes through first and second microlens arrays accommodated in a spaced-apart parallel relationship, wherein the lenses of said second array located closer to the pixel array assembly are smaller or have different focal length than those of the first array, the incident light being thereby condensed and focused to impinge onto a plurality of pixels in form of a plurality of parallel light components, respectively.

50. The method of claim 49, wherein m light beams of different wavelength ranges are created by a light source system including n light sources and a light converting means in optical path of light generated by the n light sources, wherein m>n.

51. The method of claim 49, wherein a speckle effect in a projected image is reduced by using a multi-mode laser for the creation of said at least one incident light beam.

52. The device according to claim 49, wherein the light source system comprises at least one LED.

53. A method for projecting an image comprising: creating at least one incident light beam having a predetermined cross section corresponding to a size of an active surface of a spatial light modulator (SLM) unit defined by its pixel array assembly, and directing the incident light towards the pixel array assembly; operating the pixel assembly with an imaging signal representative of an image to be projected, thereby causing modulation of the light passing through the pixel assembly; passing the modulated light through an image projecting optics to a projecting surface; the method comprising creating m light beams of different wavelength ranges by a light source system including n light sources and a light converting means in optical path of light generated by the n light sources, wherein m>n, said producing of m light beams by n light sources comprising emitting a light beam of the non-visible range, and converting said light beam into at least two light beams of different wavelengths in the visible range, said converting comprising splitting said emitted light beam into at least two spatially separated light components for pumping at least two laser crystals, respectively, to thereby produce two light beams, respectively, of different wavelengths and different from those of the pumping light components, and applying harmonic generation to said two light beams to produce two light outputs of different wavelengths in the visible range.

54. A spatial light modulator (SLM) for use in an image projecting device, the SLM comprising two spaced-apart substrates enclosing there between a multi-layer structure configured to define a pixel array arrangement formed by a pixel array assembly and at least one microlens assembly at either side of the pixel assembly the microlens assembly including at least one microlens array spaced from the pixel array assembly a predetermined distance to thereby condense and focus incident light such that substantially the entire incident light impinge onto an active pixel area of the pixel array assembly further comprising a polymer spacer between the substrate and the pixel array assembly, the microlens assembly being made in said polymer spacer.

55. The SLM according to claim 54, wherein the polymer spacer is a multi-layer structure, said microlens assembly being made as a surface relief at an interface between two polymer layers.

56. The SLM according to claim 54, wherein said microlens assembly comprises first and second microlens arrays accommodated in a spaced-apart parallel relationship at one side of the pixel array assembly, the lenses of said second array located closer to the pixel array assembly being smaller or having different focal length than those of the first array, the incident light being thereby condensed and focused to impinge onto a plurality of pixels in form of a plurality of parallel light components, respectively.

57. A method for projecting an image comprising:
  creating at least one incident light beam having a predetermined cross section corresponding to a size of an active surface of a transmissive spatial light modulator (SLM) unit defined by its pixel array assembly, and directing the incident light towards the pixel array assembly; operating the pixel assembly with an imaging signal representative of an image to be projected, thereby causing modulation of the light passing through the pixel assembly; passing the modulated light through an image projecting optics to a projecting surface, the method comprising:
  passing said incident light beam, while propagating towards the pixel array assembly inside the SLM unit, and the modulated light, while propagating from the pixel array assembly inside the SLM unit, through at least one first microlens array and at least one second microlens array at opposite sides of the pixel array assembly, respectively, such that each lens in the first array is associated with a corresponding pixel of the pixel array and with the corresponding lens in the second array, each lens being substantially of the pixel size, the microlens arrays condensing and focusing a plurality of light components of the incident light to the centers of a plurality of said pixels, respectively, and converting the condensed beams of the modulated light from the pixel array assembly into substantially parallel beams.

* * * * *